United States Patent
Pape et al.

(10) Patent No.: US 12,361,119 B2
(45) Date of Patent: Jul. 15, 2025

(54) CONSISTENT SPECULATION OF POINTER AUTHENTICATION

(71) Applicant: Apple Inc., Cupertino, CA (US)

(72) Inventors: John D Pape, Cedar Park, TX (US); Deepankar Duggal, Sunnyvale, CA (US); Christopher M Tsay, Austin, TX (US); Andrew H Lin, Mountain View, CA (US); Corey C Stappenbeck, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 11 days.

(21) Appl. No.: 18/510,540

(22) Filed: Nov. 15, 2023

(65) Prior Publication Data

US 2025/0094567 A1 Mar. 20, 2025

Related U.S. Application Data

(60) Provisional application No. 63/583,551, filed on Sep. 18, 2023.

(51) Int. Cl.
*G06F 21/75* (2013.01)
*G06F 9/38* (2018.01)
(Continued)

(52) U.S. Cl.
CPC ............ *G06F 21/54* (2013.01); *G06F 9/3806* (2013.01); *G06F 21/556* (2013.01); *G06F 21/75* (2013.01); *G06F 2207/7219* (2013.01)

(58) Field of Classification Search
CPC ........ G06F 21/54; G06F 21/556; G06F 21/75; G06F 2207/7219; G06F 9/3806
See application file for complete search history.

(56) References Cited

U.S. PATENT DOCUMENTS 10,649,782 B2  5/2020  Nassi
2002/0042874 A1  4/2002  Arora
(Continued)

FOREIGN PATENT DOCUMENTS

CN   105045562 A   11/2015
CN   108196884 A   6/2018
TW   202236088 A   9/2022

OTHER PUBLICATIONS

International Search Report and Written Opinion from PCT/US2024/046488, Date of mailing Dec. 24, 2024, pp. 1-9.
(Continued)

*Primary Examiner* — David J Pearson
(74) *Attorney, Agent, or Firm* — Robert C. Kowert; Kowert, Hood, Munyon, Rankin & Goetzel, P.C.

(57) ABSTRACT

In an embodiment, a processor includes hardware circuitry which may be used to authenticate instruction operands. The processor may execute instructions that perform operand authentication both speculatively and non-speculatively. During speculative execution of such instructions, the processor may execute authentication such that no differences in observable state of the processor, relative to authentication result, are detectable via a side channel. During speculative execution, a result of authentication may be deferred until speculative execution of the instruction, and additional instructions, may be completed. Upon resolution of a condition that indicates acceptance of the speculative execution, a speculative execution result may cause a processor exception and stalling of execution at the instruction to be performed.

20 Claims, 17 Drawing Sheets

(51) Int. Cl.
*G06F 21/54* (2013.01)
*G06F 21/55* (2013.01)

(56) References Cited

U.S. PATENT DOCUMENTS

| | | | | |
|---|---|---|---|---|
| 2010/0281465 | A1* | 11/2010 | Krishnaswamy | G06F 8/45 |
| | | | | 717/124 |
| 2014/0325238 | A1 | 10/2014 | Ghose | |
| 2015/0286821 | A1* | 10/2015 | Ghose | G06F 9/3877 |
| | | | | 713/187 |
| 2017/0060579 | A1 | 3/2017 | Vincent | |
| 2019/0286443 | A1 | 9/2019 | Solomatnikov | |
| 2020/0134234 | A1* | 4/2020 | LeMay | G06F 21/602 |
| 2021/0096872 | A1* | 4/2021 | LeMay | G06F 21/52 |
| 2022/0027467 | A1* | 1/2022 | Favor | G06F 9/30189 |
| 2022/0300610 | A1* | 9/2022 | Mendelson | G06F 21/755 |
| 2022/0358209 | A1 | 11/2022 | Favor | |
| 2024/0086526 | A1* | 3/2024 | Iles | G06F 21/54 |

OTHER PUBLICATIONS

Brief Report from Taiwan Patent Application No. 113135025, dated Apr. 25, 2025, pp. 1-9.

* cited by examiner

M Bits Memory Location/Register

| Signature 22 | Return Address 20 |

Bits(0:M-(t+1))    Bits(0:t)

FIG. 2

Sign(LR, SP, PC, Key)          Auth(LR, SP, PC, Key)

FIG. 3                          FIG. 4

```
24  If (condition) {
26      verifiedPtr = authorize(guessPtr);
28      ... // use verifiedPtr
    }
```

FIG. 5

CONSISTENT SPECULATION OF POINTER AUTHENTICATION

This application claims benefit of priority of U.S. Provisional Application Ser. No. 63/583,551, entitled "Consistent Speculation of Pointer Authentication", filed Sep. 18, 2023, which is hereby incorporated in reference herein in its entirety.

BACKGROUND

Technical Field

Embodiments described herein are related to Return-Oriented Programming (ROP) attacks employing speculative execution and mechanisms to prevent such attacks.

Description of the Related Art

ROP attacks are often used by nefarious programmers (e.g., "hackers") in an attempt to compromise the security of a system and thus gain control of the system. Generally, the ROP attacks include modifying return addresses on the stack, causing execution to return to a different program location than the original return address would indicate. By finding various instructions, or short instructions sequences, followed by returns or jumps in the code on a machine (e.g., operating system code), the ROP attacker can build a list of "instructions." Once the list of instructions forms a Turing Machine, the list can be used by a compiler to compile code to perform the tasks desired by the nefarious programmer.

BRIEF DESCRIPTION OF THE DRAWINGS

The following detailed description makes reference to the accompanying drawings, which are now briefly described.

FIG. 2 is a block diagram of one embodiment of a register/memory location for a return/jump address.

FIG. 3 is an example of instructions that sign a return/jump address.

FIG. 4 is an example of instructions that authenticate a signed return/jump address.

FIG. 5 is a flowchart illustrating an exemplary subroutine to exploit differences in behavior during speculative execution of pointer authentication.

Figure 1:
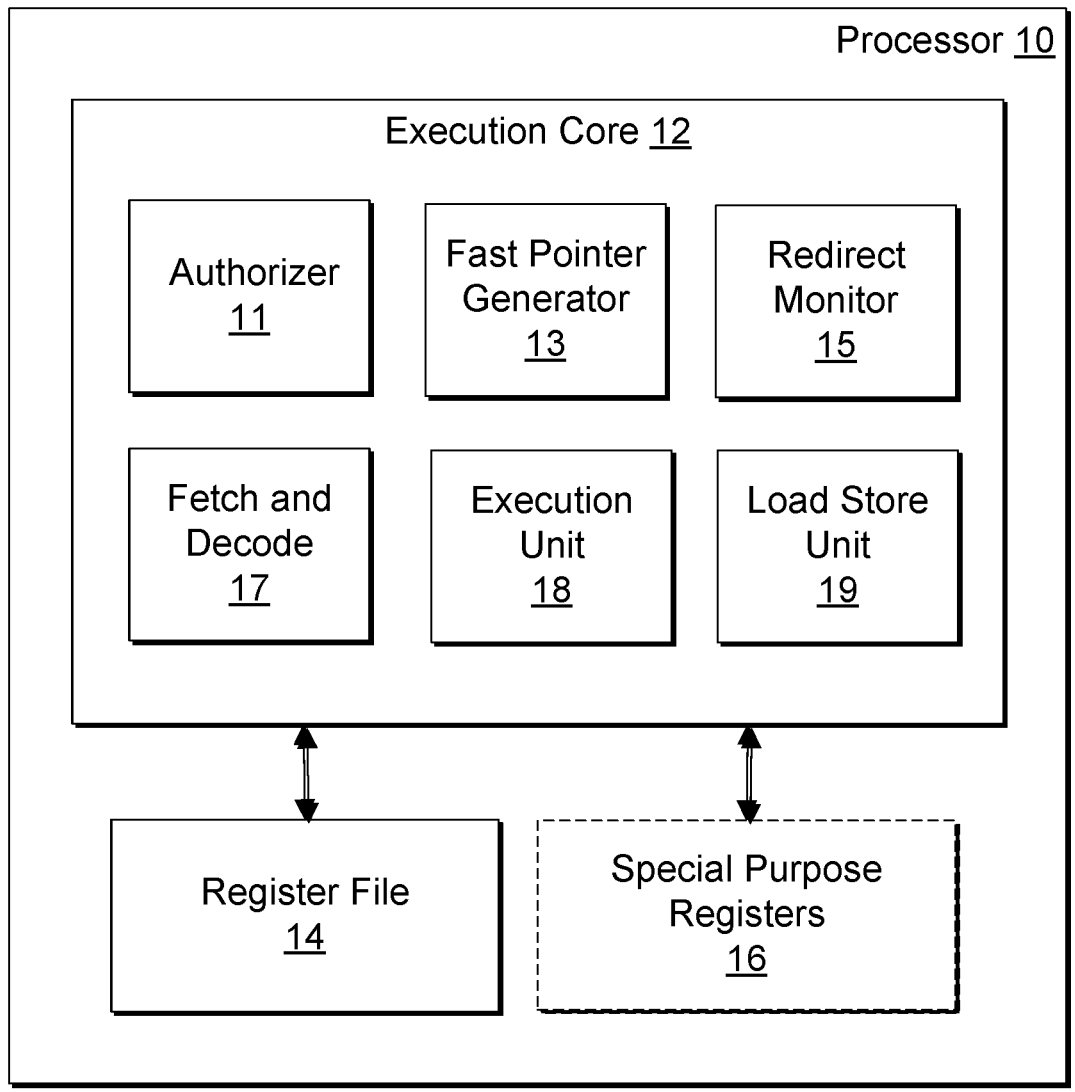
FIG. 1 is a block diagram of one embodiment of a processor providing consistent behavior during speculative execution of pointer authentication.

While embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims. The headings used herein are for organizational purposes only and are not meant to be used to limit the scope of the description.

DETAILED DESCRIPTION OF EMBODIMENTS

Normal software control flow often entails multiple pairs of call and return operations. Each call operation pushes a return address onto a stack. The corresponding return operation pops the return address off of the stack, and jumps to the location indicated by the return address. The nefarious programmer, or attacker, can try to hijack the call/return control flow to direct the return to a target piece of code that is not intended by the original software program, but is desired by the attacker. One mechanism employed by such attacks is the ROP attack in which the return address is overwritten on the stack and/or in a register (e.g., a link register) that can be used by the return instruction as a source for the return address (e.g., the stack may be popped into the link register).

Pointer authentication is a method that uses a pointer authentication code (PAC) to protect control flow integrity (CFI) in software. In the area of ROP prevention, a PAC is used to sign the return address that is pushed on the stack. In the paired return operation, the signed return address is popped from the stack and authenticated before it is used to direct control flow. As a result, even if the attacker has the ability to over-write the return address on the stack, they will need to over-write it with a properly signed value. Otherwise, at the return operation, authentication of the popped return address will fail, and the attack may be detected and terminated.

A scheme for signing the return address is to use a secret key value (e.g., in a hidden hardware register) in combination with the value of the stack pointer and the address of the callee (e.g., the target address of the call in the call/return pair, such as the start of a function that will end with a return instruction) to form a diversified key for the cryptographic signing of the return address. The secret key may also be referred to as a cryptographic key. The cryptographic key may be unique to a given system, which may help prevent "break once, run anywhere" types of attacks. That is, even if an attacker were to succeed somehow in attacking one instance of the system, ROP-style attacks could not be used on other instances of the system because the key is different and therefore the signature, even for the same call/return pair, would be different. The stack pointer is a measure of stack height at the time of the call and return operation, and is also an indication of where the return address is stored. The address of the callee identifies the location in memory at which the callee is stored, and thus identifies the callee in the signature. The return address identifies the calling code, since it is associated with the call (e.g., it may point to the next sequential instruction following the call instruction). In this manner, the signature has inputs for both the caller and the callee, linking them together. Substituting a different return address through monitoring of the stack contents at the same height for different call/return pairs may thus not be possible.

If a particular PAC has not been modified, authentication passes and the pointer can be used. If, however, the PAC has been modified, the authentication fails and a fault is signaled by the processor. This fault allows for suspension of the attacking code and detection of the code by the system. A method, however, to determine information about success or failure of a PAC authentication may employ executing the authentication speculatively, where a processor may execute an authenticate instruction while deferring generation of a fault until execution of the code path can be confirmed. If execution speculation fails, due to a misprediction of the code path, an attacker can cause an authenticate operation to be performed without risk of generating a processor fault. Thus, attacking code and deduce information regarding the PAC and make PACs vulnerable to brute force attack.

In an embodiment, a processor may include hardware circuitry to authenticate instruction operands such as PACs. The processor may execute instructions that perform operand authentication both speculatively and non-speculatively. During speculative execution of such instructions, the processor may execute authentication such that no differences in observable state of the processor, relative to authentication result, are measurable via an instrumented side channel. An example of such an instrumented side channel may be employing a high resolution timer to measure execution latencies of instruction sequences, where differences in micro-architectural effects of the instruction sequences on the observable state of the processor, such as through performance of conditional load and store operations affecting cache or memory subsystem contents, through instruction prefetch operations, through execution latencies of individual instructions, etc., may affect these latencies and therefore be detectable by attacking software. It should be understood that these are merely examples of instrumented side channels to detect differences in observable state, that any number of such side channels may be envisioned and these examples are not intended to be limiting.

During speculative execution, a result of authentication may be deferred until speculative execution of the instruction, and additional instructions, may be completed. Upon resolution of a condition that indicates acceptance of the speculative execution, a speculative execution result may cause a processor exception and stalling of execution at the instruction corresponding to an oldest speculative execution exception to be performed.

Turning now to FIG. 1, block diagram of one embodiment of a processor providing consistent behavior during speculative execution of pointer authentication is shown. In the embodiment of FIG. 1, the processor 10 may include an execution core 12 coupled to a register file 14 and optionally one or more special purpose registers 16.

The processor 10 may be representative of a general-purpose processor that performs computational operations. For example, the processor 10 may be a central processing unit (CPU) such as a microprocessor, a microcontroller, an application-specific integrated circuit (ASIC), or a field-programmable gate array (FPGA). The processor 10 may be a standalone component, or may be integrated onto an integrated circuit with other components (e.g., other processors, or other components in a system on a chip (SOC)). The processor 10 may be a component in a multichip module (MCM) with other components.

As illustrated in FIG. 1, the processor 10 may include the execution core 12. The execution core 12 may be configured to execute instructions defined in an instruction set architecture implemented by the processor 10. The execution core 12 may have any microarchitectural features and implementation features, as desired. For example, the execution core 12 may include superscalar or scalar implementations. The execution core 12 may include in-order or out-of-order implementations and may include speculative execution capabilities. The execution core 12 may include any combination of the above features. The implementations may include microcode, in some embodiments. The execution core 12 may include a variety of execution units, each execution unit configured to execute operations of various types (e.g., integer, floating point, vector, multimedia, load/store, etc.). The execution core 12 may include different numbers pipeline stages and various other performance-enhancing features such as branch prediction. The execution core 12 may include one or more of instruction decode units, schedulers or reservations stations, reorder buffers, memory management units, I/O interfaces, etc.

The register file 14 may include a set of registers that may be used to store operands for various instructions. The register file 12 may include registers of various data types, based on the type of operand the execution core 12 is configured to store in the registers (e.g., integer, floating point, multimedia, vector, etc.). The register file 14 may include architected registers (i.e., those registers that are specified in the instruction set architecture implemented by the processor 10). Alternatively or in addition, the register file 14 may include physical registers (e.g., if register renaming is implemented in the execution core 12).

The special purpose registers 16 may be registers provided in addition to the general-purpose registers. While general purpose registers may be an operand for any instruction of a given data type, special purpose registers are generally operands for particular instructions or subsets of instructions. For example, in some embodiments, a program counter register may be a special purpose register storing the fetch address of an instruction. A link register may be a register that stores a return address, and may be accessible to branch instructions. While the special purpose registers 16 are shown separate from the register file 14, they may be integrated into the register file 14 in other embodiments. In some embodiments, certain general-purpose registers may be reserved by compiler convention or other software convention to store specific values (e.g., a stack pointer, a frame pointer, etc.).

The processor 10 may be configured to perform signature and authenticate operations on return addresses, using authorizer circuitry 11, to detect whether or not the addresses have been modified between the time they were created/stored and the time they are to be used as a target. The addresses may be signed when written to memory, such as by using a load store unit 19, in some embodiments. For example, return addresses may be written to the stack in memory. In other embodiments, the return address may be signed in a register to which it is stored when the subroutine call instruction (more briefly, "call instruction") is executed. For example, a link register may be provided to which the return address is stored. When the address is later retrieved to be used as a return target address, the processor 10 may be configured to perform an authenticate operation on the addresses. Error handling may be initiated if the authenticate operations fails, instead of using the address as a fetch address. Performing a signature operation on a value may be more succinctly referred to herein as "signing" the value. Similarly, performing an authenticate operation on a value may be more succinctly referred to herein as "authenticating." The authorizer circuit 11 may implement the signature generation and authentication features, in an embodiment.

Generally performing a signature operation or "signing" an address may refer to applying a cryptographic function to the address using at least one cryptographic key and using additional data. The result of the cryptographic function is a signature. By applying the cryptographic function again at a later point and comparing the resulting value to the signature, an authenticate operation may be performed on the address (or the address may be "authenticated"). That is, if the address and/or signature have not been modified, the result of the cryptographic function should equal the signature. The cryptographic key may be specific to the thread that includes the generation of the address and the use of the address as a target, and thus the likelihood of an undetected modification by a third party without the key may be exceedingly remote. The cryptographic key may be generated, at least in part, based on a "secret" that is specific to the instance of the processor 10 and is not accessible except in hardware. The cryptographic key itself may also not be accessible to software, and thus the key may remain secret and difficult to discover by a third party.

In an embodiment, the additional data used in the signature and authentication of the return address may include an address at which the return address is stored. For example, a virtual address of the location may be used (e.g., the virtual stack pointer, for storage of the address on the stack). Other embodiments may use the physical address. Additionally, the additional data may include the address of the callee (e.g., the first instruction of the function being called). That is, the address may be the target address of the call instruction, referred to herein as the program counter address of the callee, or the PC. As mentioned above, the signature instruction may generally specify a source operand to be signed, and the signature may be generated based on the cryptographic key, the stack pointer, and the PC of the sign instruction (plus an offset specified by the signature instruction).

The cryptographic function applied to the return address may be an encryption of the address using the key(s). The encrypted result as a whole may be the signature, or a portion of the result may be the signature (e.g., the signature may be shortened via truncation or shifting). Any encryption algorithm may be used, including a variety of examples given below.

It should be understood that the above description of cryptographic signatures is one example of address authentication. Another example may employ the use of address metadata assigned during allocation of memory. In this example, metadata, such as a memory tag, may be allocated along with a portion of memory. Subsequent accesses of the memory may then be conditioned on authentication of the memory tag. An accessor of the memory must provide the original memory tag assigned which the processor may then compare to a saved copy of the memory tag to perform the required authentication. It should be understood that these are merely examples of authentication and are not intended to be limiting. Furthermore, a processor may employ multiple authentication techniques, in various embodiments.

An instruction may be an executable entity defined in an instruction set architecture implemented by the processor 10. There are a variety of instruction set architectures in existence (e.g., the x86 architecture original developed by Intel, ARM from ARM Holdings, Power and PowerPC from IBM/Motorola, etc.). Each instruction is defined in the instruction set architecture, including its coding in memory, its operation, and its effect on registers, memory locations, and/or other processor state. A given implementation of the instruction set architecture may execute each instruction directly, although its form may be altered through decoding and other manipulation in the processor hardware. Another implementation may decode at least some instructions into multiple instruction operations for execution by the execution units in the processor 10. Some instructions may be microcoded, in some embodiments. Accordingly, the term "instruction operation" may be used herein to refer to an operation that an execution unit in the processor 10/execution core 12 is configured to execute as a single entity. Instructions may have a one-to-one correspondence with instruction operations, and in some cases an instruction operation may be an instruction (possibly modified in form internal to the processor 10/execution core 12). Instructions may also have a one to more than one (one to many) correspondence with instruction operations. An instruction operation may be more briefly referred to herein as an "op."

In an embodiment, the processor 10 comprises one or more registers and an execution core coupled to the one or more registers. Fetch and decode 17 circuitry of the processor 10 may determine to speculatively execute instructions using an execution unit 18 based on an unresolved condition resulting in a predicted instruction stream. Authentication operations may be performed, in some embodiments, using a fast pointer generator 13 that unconditionally generates pointer addresses usable by the processor 10 to complete execution of the instruction without waiting on an authentication result from the authorizer 11. Authentication results from the authorizer 11 may then be monitored by a redirect monitor 15 such that the processor 10 may report processor exceptions resulting from execution once resolution of the condition causing speculative execution occurs. Completion of execution of the instruction may, in some embodiments, use a load store unit 19 to perform memory operations using the pointer addresses generated by the past pointer generator 13.

Turning now to FIG. 2, a block diagram illustrating one embodiment of an M bit memory location or register is shown. M may be an integer greater than zero. More particularly, M may be the architectural size of a virtual address in the processor 10. For example, some instruction set architectures specify 64 bit addresses currently. However, the actual implemented virtual address size may be smaller, (e.g., 40 to 48 bits of address). Thus, some of the address bits are effectively unused in such implementations. In an embodiment, the most significant implemented virtual address bit may be replicated in the remaining virtual address bits, up to the architected maximum. In an embodiment, one or more most significant bits of the architected maximum may be viewed as inactive, and the most significant address bit may be replicated up to the most significant active address bit. For example, the most significant bit may be viewed as active or inactive, in an embodiment. The unused bits may be used to store the signature for the address, in an embodiment. Other embodiments may store the signature in another memory location.

In the embodiment of FIG. 2, t+1 bits of virtual address are implemented (field 20), where t is less than M and is also an integer. The remaining bits of the register/memory location store the signature (field 22). The signature as generated from the encryption algorithm may be larger than the signature field 22 (e.g., larger than M−(t+1) bits). Accordingly, the signature actually stored for the address may be a portion of the signature. That is, the signature may be reduced in size from the signature generated by the signature operation, and may replace a subset of bits of the return address. For example, the signature may be truncated. Alternatively, the signature may be right-shifted. Any mechanism for shortening the signature field may be used.

The processor 10 may implement the signature generation and authentication in hardware. For example, signature generation/authentication circuit 18 is shown in FIG. 1 and may include circuitry to sign and authenticate return addresses (or more generally, to sign and authenticate a source operand). There may be instructions defined for the instruction set architecture which cause the signature to be generated or authentication to be performed. FIGS. 3 and 4 illustrate embodiments of instructions for signature generation and authentication, respectively.

FIG. 3 illustrates an embodiment of a signature generation instruction. In this embodiment, the Signature (Sign) instruction takes as input operands a virtual return address stored in a link register (LR), a virtual stack pointer address stored in a stack pointer register (SP), a virtual instruction address (PC), and a key. The PC may be the address at which the signature instruction is stored. The key may be stored in a hardware-accessible register or other storage device for access by the hardware only. The key may be one key, or multiple keys, depending on the encryption algorithm that is implemented by the processor 10. The coding illustrated in FIG. 3 may be an example for return address authentication. More generally, the LR may be any source operand (e.g., any register). The sign instruction may also specify an offset, in an embodiment, such as a displacement or an immediate field. The displacement/immediate field may be added to the PC operand.

The Sign instruction may apply an encryption algorithm to the data producing a signature which may be written to a target register (e.g., back to the link register). The data may be combined prior to the encryption (e.g., the return address, stack pointer, and PC may be logically combined according to any desired logic function, such as exclusive-OR-based functions) and the resulting data may be encrypted with the key. The data may be concatenated and encrypted using one or more passes of a block encryption (block cipher) mechanism. Any type of encryption may be used, including any type of block encryption such as advanced encryption standard (AES), data encryption standard (DES), international data encryption algorithm (IDEA), PRINCE, etc. A factor in determining the encryption algorithm to be used is latency of the algorithm. Accordingly, a single pass of encryption may be selected that is strong enough to protect the encrypted data to a desired level of security. A signature resulting from the encryption may then be shortened to match the field 22. The result in the target register may be of the form shown in FIG. 2.

As mentioned above, a variety of logic operations may be used to combine the data included in the signature generation. The least significant bits (LSBs) of the addresses may contain the most entropy, which may provide for secure encryption. The most significant bit (MSB) of the address differentiates privileged and unprivileged memory, in an embodiment. As mentioned above, bits 0 . . . t may contain an address and bits t+1 to M may be the replicated bit. Additionally in an embodiment, the PC and LR registers may be required to be aligned to 32-bit boundaries (e.g., the instructions may be 32 bit fixed-length instructions in the implemented ISA). The stack pointer may be aligned to a 128-bit boundary (e.g., pairs of 64 bits values may generally be pushed and popped on the stack).

Accordingly, the bits to be encrypted may include PC bits t to 2, LR bits t . . . 2, and SP bits t . . . 4. In an embodiment, the following mechanism may be used: Form a first value P using the least significant 21 bits from of LR, PC, and SP to form a 63-bit value, and append bit t of PC at bit position 63 to form a 64-bit value to be encrypted; Form a diversifier value D using the middle-significant 21 bits of LR, PC, and SP, and appending bit t of LR at bit position 63 to form a 64-bit value to use as the diversifier; form a third value R by interleaving the remaining implemented bits of LR, PC, and SP (e.g., up to bit t) and 0. Replicate the resulting value across 64-bits, leaving bit 63 zero; and encrypt the values as follows using cryptography which takes 2 64-bit values to generate a single encrypted 64-bit value C=E (X, Y), where X is R XOR P, and Y is R XOR D. The resulting encrypted value C may then be shorted to produce the signature field 22. For example, M-t bits may be extracted from C and used as the signature.

FIG. 4 illustrates an embodiment of the authentication instruction. The Auth instruction may take as input operands the LR, SP, and PC values and a key. The Auth instruction may apply the same encryption algorithm as the Sign instruction to the return address field 20, producing a signature. The resulting signature may be compared to the original signature in the signature field 22 (shortened in the same fashion as the original signature was shortened). If the signatures do not match, the authentication fails and return to the address is prevented. If the signatures match, the authentication passes and return to the address is permitted. The return may be prevented, e.g., by taking an exception. As mentioned above, more generally the authentication instruction may take any source operand in place of the LR register. The authentication instruction may specify an offset (e.g., displacement or immediate field) to be added to the PC.

In an embodiment, the Sign and Auth instructions may be implemented as two or more instruction operations in the processor 10. For example, in an embodiment, the callee address may be specified as the PC of the call instruction plus an offset or immediate field. One instruction operation may add the PC and offset/immediate to produce the PC to be used by the Sign and Auth instructions. The other instruction operation may take the PC generated by the first instruction operation, the LR and SP values, and may perform the signature/authentication operation using the specified key.

Turning next to FIG. 5, a flowchart is shown illustrating an exemplary subroutine to exploit differences in behavior during speculative execution of pointer authentication. While FIG. 5 uses pseudocode indicative of a number of high level programming languages, it should be understood that any number of languages may be employed, including direct coding of processor instructions that implement the concepts shown in FIG. 5.

An exemplary subroutine may include a condition 24 that defines conditional execution, an authentication operation 26 to be analyzed and potentially additional instructions or operations 28. The authentication operation 26 may perform authentication on a guessed pointer to generate a verified pointer should the guessed pointer pass authentication. If the guessed pointer fails authentication, a risk of processor fault or exception may occur. To prevent this fault, the condition 24 may be established to always fail, resulting the bypassing of execution of the potentially failing authentication 26. Thus, through speculative execution resulting from predicted execution of 26 and 28, an authentication operation 26 may be executed without risk of processor exception as condition 24 will always evaluated to a false condition, in various embodiments.

Figure 6:
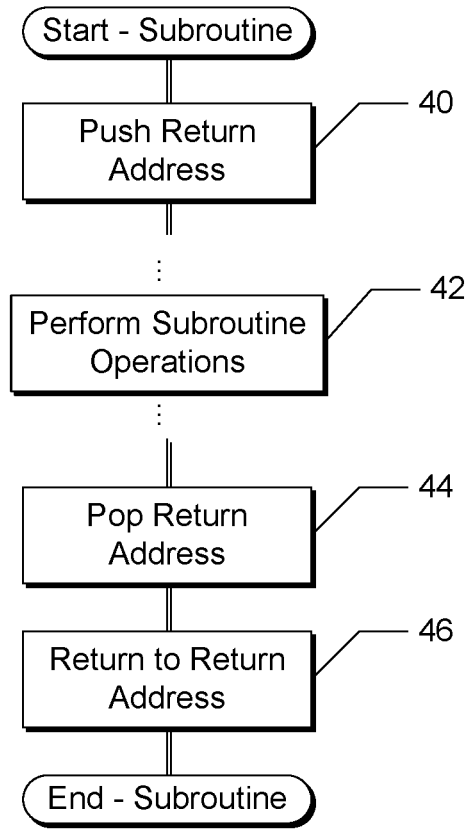
FIG. 6 is a flowchart illustrating an exemplary subroutine.

Turning next to FIG. 6, a flowchart is shown illustrating an exemplary subroutine that may be executed by the processor 10 in a system. While the blocks are shown in a particular order for ease of understanding, other orders may be used. Instructions executed by the processor 10 and/or hardware in the processor 10 may implement the operation shown in FIG. 5.

The processor 10 may push the return address for the subroutine onto the stack (block 40). The push may occur in the calling code, before jumping to the address of the subroutine, or may occur within the subroutine. Additional details regarding some embodiments of pushing the return address are described below with regard to FIG. 6. The subroutine may include instructions that perform the operation(s) for which the subroutine is designed (indicated generally at reference numeral 42). The subroutine may pop the return address from the stack (block 44) and return to the return address (block 46). That is, the return address may be used as a fetch address to fetch the next instructions to execute in the processor 10. Additional details regarding some embodiments of popping the return address are described below with regard to FIG. 7.

Figure 7:
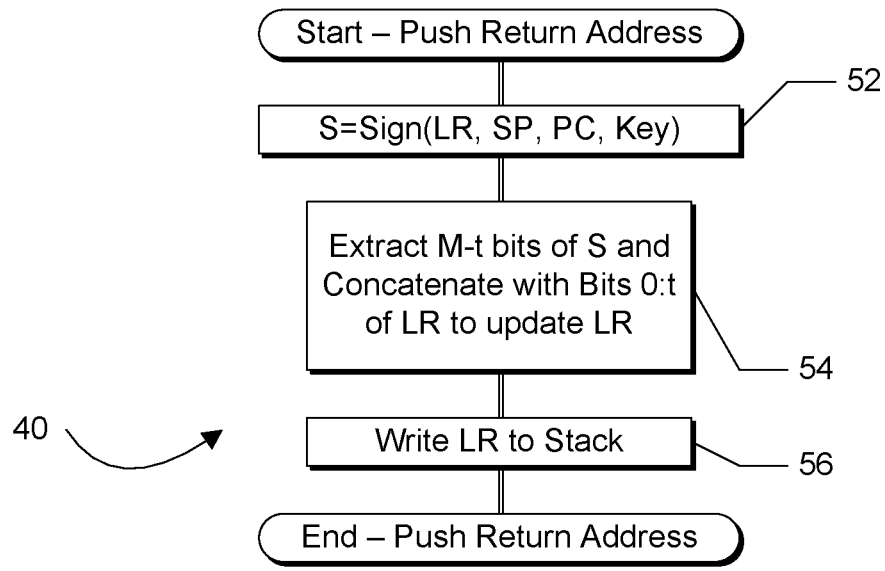
FIG. 7 is a flowchart illustrating the pushing of a return address for one embodiment.

Turning now to FIG. 7, a flowchart is shown illustrating one embodiment of pushing a return address (e.g., block 40 in FIG. 5). While the blocks are shown in a particular order for ease of understanding, other orders may be used. Instructions executed by the processor 10 and/or hardware in the processor 10 may implement the operation shown in FIG. 6.

The signature based on the VA, the return address (LR), the address of the callee (PC) and the key may be generated by applying the selected encryption algorithm to the data (block 52). The generated signature may be combined with the return address to form the signed return address (e.g., as shown in FIG. 2) (block 54). For example, M-t bits may be extracted from S and concatenated with bits 0:t of the return address (LR) and may be written to LR as the signed return address. The signed return address from LR may be pushed onto a memory location indicated by the value of the stack pointer (block 56). As mentioned above, any encryption algorithm may be used. For example, multiple passes of a block encryption algorithm may be used. In an embodiment, the PRINCE algorithm may be used.

Figure 8:
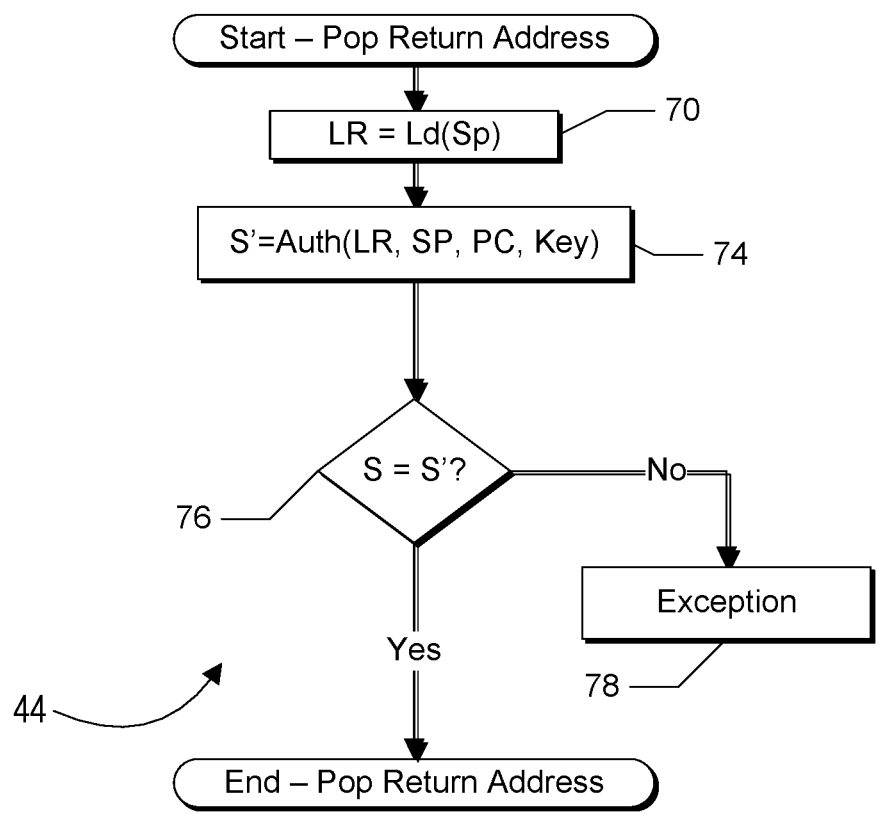
FIG. 8 is a flowchart illustrating the popping of a return address for one embodiment.

Turning now to FIG. 8, a flowchart is shown illustrating one embodiment of popping a return address (e.g., block 44 in FIG. 5). While the blocks are shown in a particular order for ease of understanding, other orders may be used. Instructions executed by the processor 10 and/or hardware in the processor 10 may implement the operation shown in FIG. 7.

The signed return address may be loaded from the memory location indicated by the value of the stack pointer into a target register (e.g., LR) (block 70). The signed return address may be authenticated by applying the same operation that was applied when the return address was initially signed, producing a signature S'. S' may be compared the signature field 22 (block 74). If the signature remains valid (i.e., the signature S' generated in the authentication matches the original signature S in the address) (decision block 76, "yes" leg), the return address may be used and thus operation may proceed to block 46 in FIG. 5. Otherwise (decision block 76, "no" leg), the processor 10 may signal an exception to prevent the return address from being used (block 78).

In an embodiment, a method comprises generating a return address for a call to a subroutine that is terminated by a return instruction in a processor; performing a signature operation on the return address to generate a signed return address, wherein the signature operation is based on a cryptographic key, a value of a stack pointer, and an address of an initial instruction in the subroutine; detecting an attempt to use the signed return address by the return instruction; authenticating the signed address responsive to detecting the attempt; and preventing the return to a failure in authenticating the signed address.

As mentioned previously, one embodiment of the encryption algorithm may be the PRINCE algorithm. The PRINCE algorithm employs a 128-bit key, which is expressed as two 64-bit keys K0 and K1. The 128-bit key is expanded to 192 bits by generating a K0'. K0' is the exclusive OR of K0 right rotated by one and K0 right shifted by 63. PRINCE is based on the so-called FX construction [7, 30]: the first two subkeys K0 and K0' are whitening keys, while the key K1 is the 64-bit key for a 12-round block cipher referred to as $PRINCE_{core}$. The 12 rounds may be unrolled so that the latency of the cipher is 1 clock cycle, in some embodiments. Additional details of the PRINCE algorithm are provided in the paper "PRINCE—A Low-latency Block Cipher for Pervasive Computing Applications" by Borghoff et al., published in Xiaoyun Wang and Kazue Sako, editors. Advances in Cryptology—ASIACRYPT 2012—18th International Conference on the Theory and Application of Cryptology and Information Security, Beijing, China, Dec. 2-6, 2012, pages 208-225.

Figure 9:
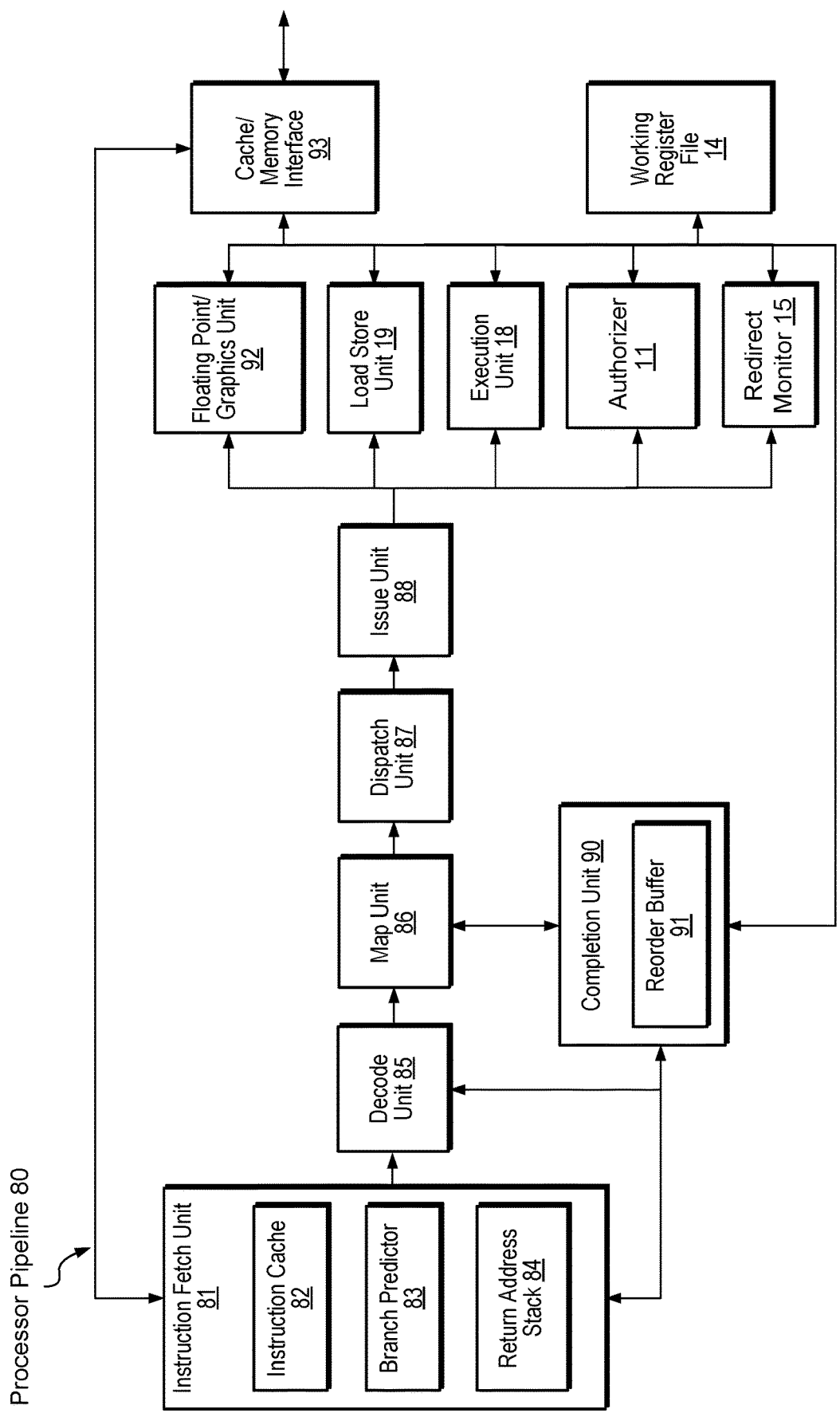
FIG. 9 is a block diagram of one embodiment of a processor pipeline providing consistent behavior during speculative execution of pointer authentication.

Turning now to FIG. 9, a block diagram of one embodiment of a processor pipeline providing consistent behavior during speculative execution of pointer authentication is shown. In various embodiments, the logic of processor pipeline 80 may be included in one or more of cores of a central processing unit (CPU). Processor pipeline 80 includes instruction fetch unit (IFU) 81 which includes an instruction cache 82, a branch predictor 83 and a return address stack (RAS) 84. IFU 81 may also include a number of data structures in addition to those shown such as an instruction translation lookaside buffer (ITLB), instruction buffers, and/or other structures configured to store state that is relevant to thread selection and processing (in multi-threaded embodiments of processor pipeline 80).

IFU 81 is coupled to an instruction processing pipeline that begins with a decode unit 85 and proceeds in turn through a map unit 86, a dispatch unit 87, and issue unit 88. Issue unit 88 is coupled to issue instructions to any of a number of instruction execution resources including execution unit(s) 18, a load store unit (LSU) 19, and/or a floating-point/graphics unit (FGU) 92. The execution unit(s) 18 use an authorizer 11 for generating and checking signatures based on at least a portion of a return address used for a procedure return. Additionally, the authorizer 11 may report results to a redirect monitor 15 which may accumulator deferred fault and execution stall sources for later reporting though a completion unit 90.

The instruction execution resources are coupled to a working register file 14. Additionally, LSU 19 is coupled to cache/memory interface 93. Reorder buffer 91 is coupled to IFU 81, decode unit 85, working register file 14 and the outputs of any number of instruction execution resources. It is noted that the illustrated embodiment is merely one example of how processor pipeline 80 may be implemented. Processor pipeline 80 may include other components and interfaces not shown in FIG. 9. Alternative configurations and variations are possible and contemplated.

In one embodiment, IFU 81 may be configured to fetch instructions from instruction cache 82 and buffer them for downstream processing. The IFU 81 may also request data from a cache or memory through cache/memory interface 93 in response to instruction cache misses, and predict the direction and target of control transfer instructions (e.g., branches).

The instructions that are fetched by IFU 81 in a given clock cycle may be referred to as a fetch group, with the fetch group including any number of instructions, depending on the embodiment. The branch predictor 83 may use one or more branch prediction tables and mechanisms for determining a next fetch program counter sooner than the branch target address is resolved. In various embodiments, the predicted address is verified later in the pipeline by comparison to an address computed by the execution unit(s) 18. For the RAS 84, the predicted return address is verified when a return address (branch target address) is retrieved from a copy of the memory stack stored in the data cache via the LSU 19 and the cache interface 93.

Prior to the branch target address being resolved, fetched instructions may be executed speculatively by execution unit 18. During speculative execution, potential execution stalls and processor exceptions may be tracked by the redirect monitor 15. Then, when the branch target address is resolved, the redirect monitor 15 may provide an oldest exception source for reporting by the completion unit 90.

In various embodiments, predictions occur at the granularity of fetch groups (which include multiple instructions). In other embodiments, predictions occur at the granularity of individual instructions. In the case of a misprediction, the front-end of pipeline stages of processor pipeline 80 may be flushed and fetches may be restarted at the new address.

IFU 81 conveys fetched instruction data to decode unit 85. In one embodiment, decode unit 85 may be configured to prepare fetched instructions for further processing. Decode unit 85 may be configured to identify the particular nature of an instruction (e.g., as specified by its opcode) and to determine the source and destination registers encoded in an instruction, if any. Map unit 86 may be configured to map the decoded instructions (or uops) to physical registers within processor pipeline 80. Map unit 86 may also implement register renaming to map source register addresses from the uops to the source operand numbers identifying the renamed source registers. Dispatch unit 87 may be configured to dispatch uops to reservation stations (not shown) within the various execution units.

Issue unit 88 may be configured to provide instruction sources and data to the various execution units for picked (i.e., scheduled or dispatched) instructions. In one embodiment, issue unit 88 may be configured to read source operands from the appropriate source, which may vary depending upon the state of the pipeline. For example, if a source operand depends on a prior instruction that is still in the execution pipeline, the operand may be bypassed directly from the appropriate execution unit result bus. Results may also be sourced from register files representing architectural (i.e., user-visible) as well as non-architectural state. In the illustrated embodiment, processor pipeline 80 includes a working register file 14 that may be configured to store instruction results (e.g., integer results, floating-point results, and/or condition signature results) that have not yet been committed to architectural state, and which may serve as the source for certain operands. The various execution units may also maintain architectural integer, floating-point, and condition signature state from which operands may be sourced.

Instructions issued from issue unit 88 may proceed to one or more of the illustrated execution units to be performed. In one embodiment, each of execution unit(s) 18 is similarly or identically configured to perform certain integer-type instructions defined in the implemented ISA, such as arithmetic, logical, and shift instructions. In some embodiments, architectural and non-architectural register files are physically implemented within or near execution unit(s) 18. It is contemplated that in some embodiments, processor pipeline 80 may include any number of integer execution units, and the execution units may or may not be symmetric in functionality.

Load store unit (LSU) 19 may be configured to process data memory references, such as integer and floating-point load and store instructions and other types of memory reference instructions. LSU 19 may include a data cache (not shown) as well as logic configured to detect data cache misses and to responsively request data from a cache or memory through cache/memory interface 93. In one embodiment, a data cache in LSU 19 may be configured as a set-associative, write-through cache in which all stores are written to a higher-level (e.g., L2) cache regardless of whether they hit in the data cache.

In various embodiments, LSU 19 may implement a variety of structures configured to facilitate memory operations. For example, LSU 19 may implement a data TLB to cache virtual data address translations, as well as load and store buffers configured to store issued but not-yet-committed load and store instructions for the purposes of coherency snooping and dependency checking. LSU 19 may include a miss buffer configured to store outstanding loads and stores that cannot yet complete, for example due to cache misses. In one embodiment, LSU 19 may implement a store queue configured to store address and data information for stores that have committed, in order to facilitate load dependency checking. LSU 19 may also include hardware configured to support atomic load-store instructions, memory-related exception detection, and read and write access to special-purpose registers (e.g., control registers).

Floating-point/graphics unit (FGU) 92 may be configured to perform and provide results for certain floating-point and graphics-oriented instructions defined in the implemented ISA. For example, in one embodiment FGU 92 implements single-precision and double-precision floating-point arithmetic instructions compliant with the IEEE floating-point standards, such as add, subtract, multiply, divide, and certain transcendental functions.

In the illustrated embodiment, completion unit 90 includes reorder buffer (ROB) 91 and coordinates transfer of speculative results into the architectural state of processor pipeline 80. Entries in ROB 91 may be allocated in program order. Completion unit 90 may include other elements for handling completion/retirement of instructions and/or storing history including register values, etc. In some embodiments, speculative results of instructions may be stored in ROB 91 before being committed to the architectural state of processor pipeline 80, and confirmed results may be committed in program order. Entries in ROB 91 may be marked as completed when their results are allowed to be written to the architectural state. Completion unit 90 may also be configured to coordinate instruction flushing and/or replaying of instructions and coordinate generation of processor exceptions with redirect monitor 15.

In various embodiments, when the decode unit 85 determines a procedure call for a subroutine occurs in the instructions of the software application, an indication is sent down the pipeline to the authorizer 11 for generating a cryptographic signature for the associated return address. The authorizer 11 uses one of a variety of cryptographic algorithms. For example, in some embodiments, the authorizer 11 uses one of many variations of the relatively low-latency block cipher PRINCE algorithm. In some embodiments, the authorizer 11 uses some logic in the FPGU 92. In other embodiments, the authorizer 11 uses only logic within itself. One or more keys stored in secure memory, the return address, and possibly one or more other values as selected by designers are used as inputs to the cryptographic algorithm.

In various embodiments, the procedure call is not completed until the signature is generated by the authorizer 11. In various embodiments, the signature and the return address are stored together as a unit to provide a value for the branch target address. In some embodiments, the signature and the return address are concatenated. In various embodiments, a first copy of the concatenated signature and return address is stored in the RAS 84 while a second copy is stored in the memory stack provided by the operating system. The second copy is sent to the data cache via the LSU 19 and the cache interface 93. Storing each of the first copy and the second copy may be referred to as "pushing" the return address.

In various embodiments, when the decode unit 85 determines a procedure return corresponding to the earlier procedure call occurs in the instructions of the software application, an indication is sent down the pipeline to the authorizer 11 for regenerating the cryptographic signature for the associated return address. Additionally, the RAS 84 receives an indication, such as the PC register value, to provide the predicted return address. Further, the LSU 19 receives a load instruction for reading the copy of the branch target address stored in memory such as the memory stack provided by the operating system.

In various embodiments, the RAS 84 provides a predicted branch target address for instruction fetching before the LSU 19 completes or the authorizer 11 has even started let alone completes. In one example, the RAS 84 provides the predicted branch target address in one clock cycle to the instruction fetch unit 81. In some embodiments, the RAS 84 also stores the cryptographic signature along with the predicted return address. In other embodiments, the cryptographic signature is stored separately in a software-invisible hardware register.

The instruction fetch unit 81 begins fetching instructions stored in memory locations pointed to by the received return address prior to the authorizer 11 completes. Although instruction processing continues while authentication is being performed, the register indirect branch (jump) instruction corresponding to the procedure return is not permitted to commit. As the processor pipeline 80 uses in-order commit, no instruction commits before authentication completes although the instructions are processing.

When the LSU 19 receives the copy of the cryptographic signature and the return address from the data cache via the interface 93, the copy of the return address is compared with the copy of the return address supplied earlier by the RAS 84. If a mismatch is found, then branch misprediction recovery is performed. Otherwise, the instruction processing continues. In some embodiments, the authorizer 11 begins regenerating the signature based on the copy of the return address from the RAS 84. In other embodiments, the authorizer 11 begins regenerating the signature based on the copy of the return address from the LSU 19.

When authorizer 11 completes regenerating the cryptographic signature, this value is compared to one or more of the copies of the signature retrieved earlier from the RAS 84 and the LSU 19. If the compared values match, instruction processing continues and the register indirect jump instruction is permitted to commit. If a mismatch is found during the one or more comparisons of the copies of the signature, then an exception is generated and processor execution halts with no instruction or state committed. Therefore, security is provided without impacting performance during the procedure return.

Figure 10:
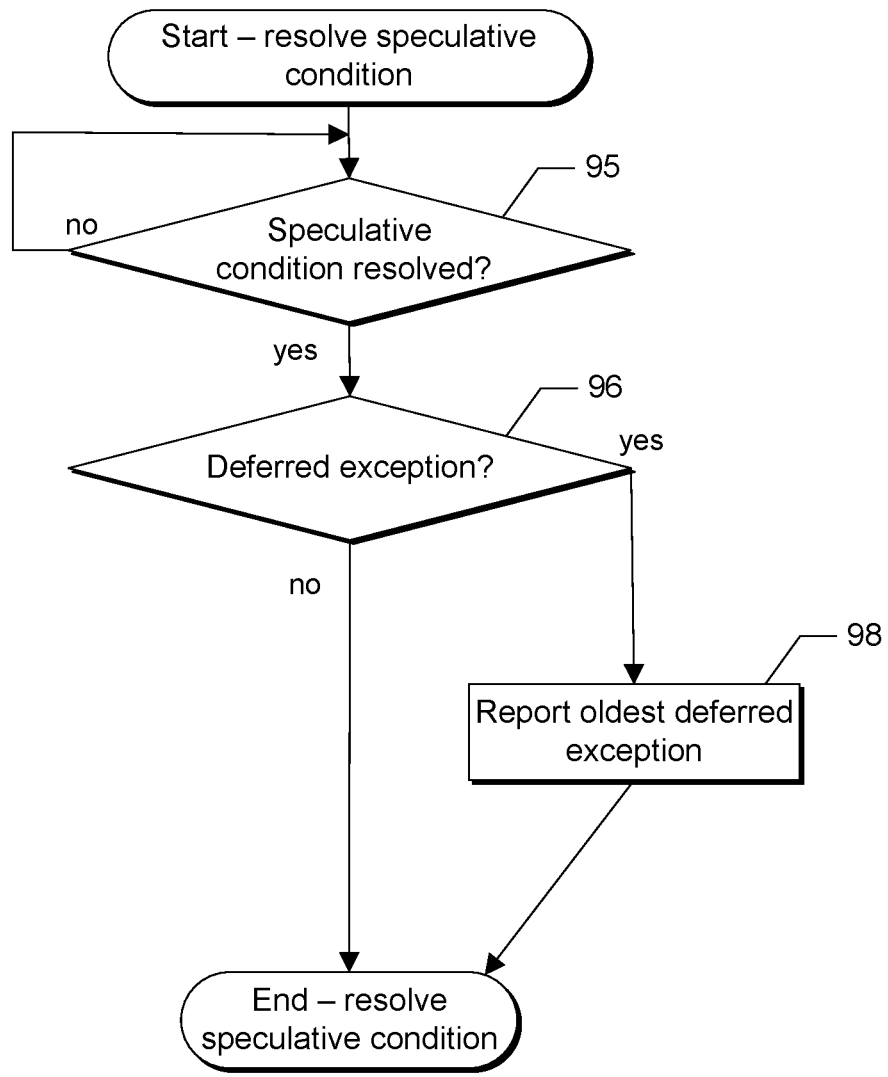
FIG. 10 is a flowchart illustrating resolution of a speculative execution condition, in one embodiment.

Turning now to FIG. 10, a flowchart is shown illustrating resolution of a speculative execution condition, in one embodiment. A processor, such as the processor 10 of FIG. 1, may speculatively execute one or more instructions according to an unresolved condition. Examples of such unresolved conditions are Boolean results of comparison operations or conditions checks of processor flags of special registers, such as the special registers 14 of FIG. 1, in various embodiments. As a processor may not immediately determine the results of such conditions, a processor may predict an execution path, or instruction stream, to execute speculatively while the condition remains unresolved.

As shown in 95, a process may wait until a condition causing speculative execution is unresolved. If the condition is not resolved, as indicated in a negative exit at 95, the process may return to 95. If the condition is resolved, as indicated in a positive exit at 95, the process may advance to 96.

As shown in 96, the processor may then determine if a deferred exception due to speculative execution exists, such as through the redirect monitor 15 of FIG. 1. If no deferred exception exists, as indicated in a negative exit at 96, the process is complete. If a deferred exception exists, as indicated in a positive exit at 96, the process may advance to 98.

As shown in 98, an oldest deferred exception may then be selected. As some deferred exception sources may not result in stalling of speculative execution, multiple deferred exception may exist. Therefore, only the first, and oldest, exception resulting from speculative execution may be reported, along with a corresponding instruction generating the exception. This exception is then selected and reported as part of concluding speculative execution. The process is then complete.

Figure 11:
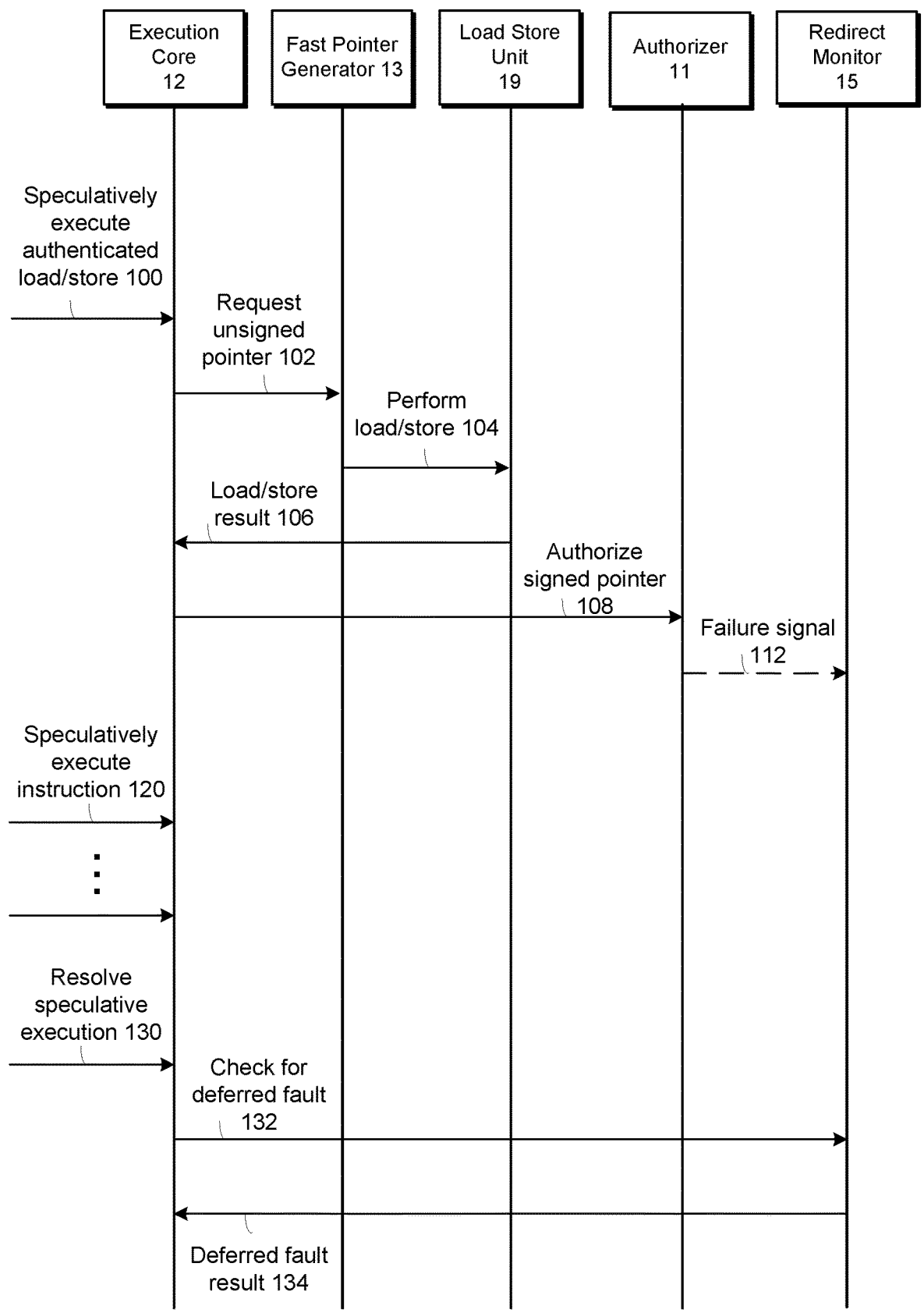
FIG. 11 is a timing diagram illustrating a sequence of events implementing an authenticated load instruction, in one embodiment.

Turning now to FIG. 11, a timing diagram is shown illustrating a sequence of events implementing an authenticated load instruction, in one embodiment. As shown in 100, an authenticated load or authenticated store instruction may be decoded for speculative execution by an execution core 12 of a processor. First, the execution core 12 may request an unsigned memory address pointer 102 of a fast pointer generator 13, where the unsigned memory address pointer would match a pointer resulting from a successful authentication of a signed memory address pointer operand of the load/store instruction. This unsigned memory address pointer may then be provided to a load/store unit 19 as part of a request to perform a speculative load/store operation 104. The load/store unit 19 may then provide a load/store result 106 to the execution unit 18.

Independently of the load/store operation, the execution core 12 may request authorization of a signed pointer operand of the instruction 108 to an authorizer 11. Should authorization of the signed pointer fail, the authorizer 11 may report the failure 112 to a redirect monitor 15. Should authorization succeed, reporting of an authorized pointer by the authorizer 11 is not needed as authorization success was assumed in steps 104 and 106. Speculative execution by the processor may then continue for additional instructions decoded for speculative execution as shown in 120.

Then, upon resolution of a speculative execution condition 130, the execution core 12 may resolve speculative execution of the various instructions by checking for a deferred fault 132 from the redirect monitor 15. If a deferred fault is registered, such as in step 112, the fault may be returned to the execution core 12 for subsequent reporting.

Figure 12:
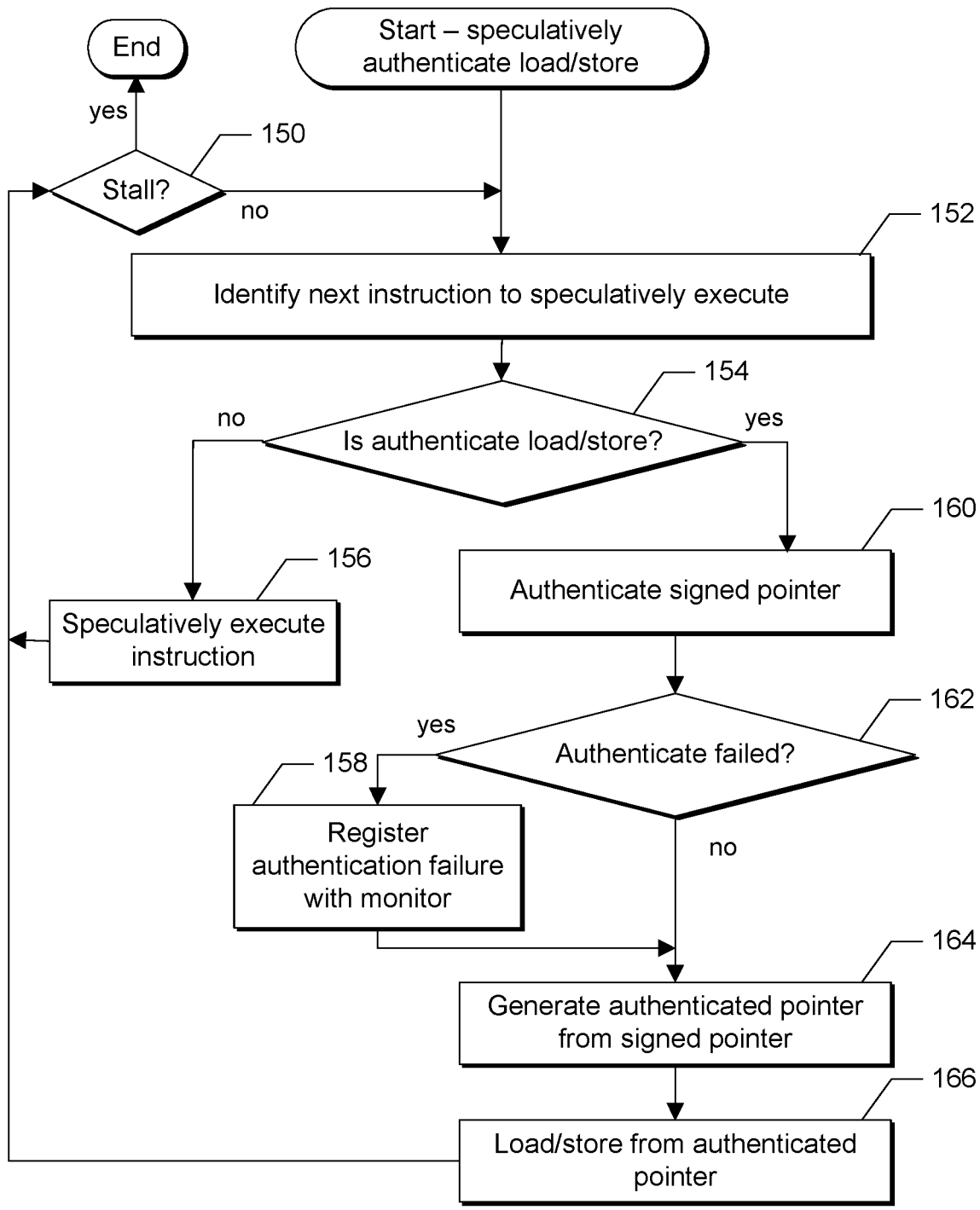
FIG. 12 is a flowchart illustrating an authenticated load instruction, in one embodiment.

Turning now to FIG. 12, a flowchart is shown illustrating an authenticated load instruction, in one embodiment. The process begins at step 152 where a next instruction to speculatively execute is identified. If the instruction is an authenticated load/store instruction, as indicated by a positive exit from 154, the process may advance to 160. If the instruction is not an authenticated load/store instruction, as indicated by a negative exit from 154, the process may advance to 156.

As shown in 156, the process may then speculatively execute the instruction. Speculatively execution of the instruction may result in generation of a deferred exception condition, with or without a stalling of speculative execution. If speculative execution stalls, as shown in a positive exit from 150, the process is complete. If speculative execution does not stall, as shown in a negative exit from 150, the process may return to 152.

As shown in 160, authentication of a signed pointer operand of the instruction may then be performed. If the authentication fails, as shown in a positive exit from 162, the authentication failure may be registered 158 with a monitor, such as the redirect monitor 15 of FIG. 1, for future reporting as discussed in FIG. 10 above and the process may advance to 164. If the authentication succeeds, as shown in a negative exit from 162, the process may advance to 164.

As shown in 164, an unsigned pointer, equivalent to a pointer returned through successful authentication of the signed pointer operand, may then be generated, such as by the fast pointer generator 13 of FIG. 1. This pointer may then be provided to a load store unit, such as the load/store unit 19 of FIG. 1, to perform the load/store portion of the instruction. As speculative execution of the authentication load/store does not stall, the process may then return to 152.

Figure 13:
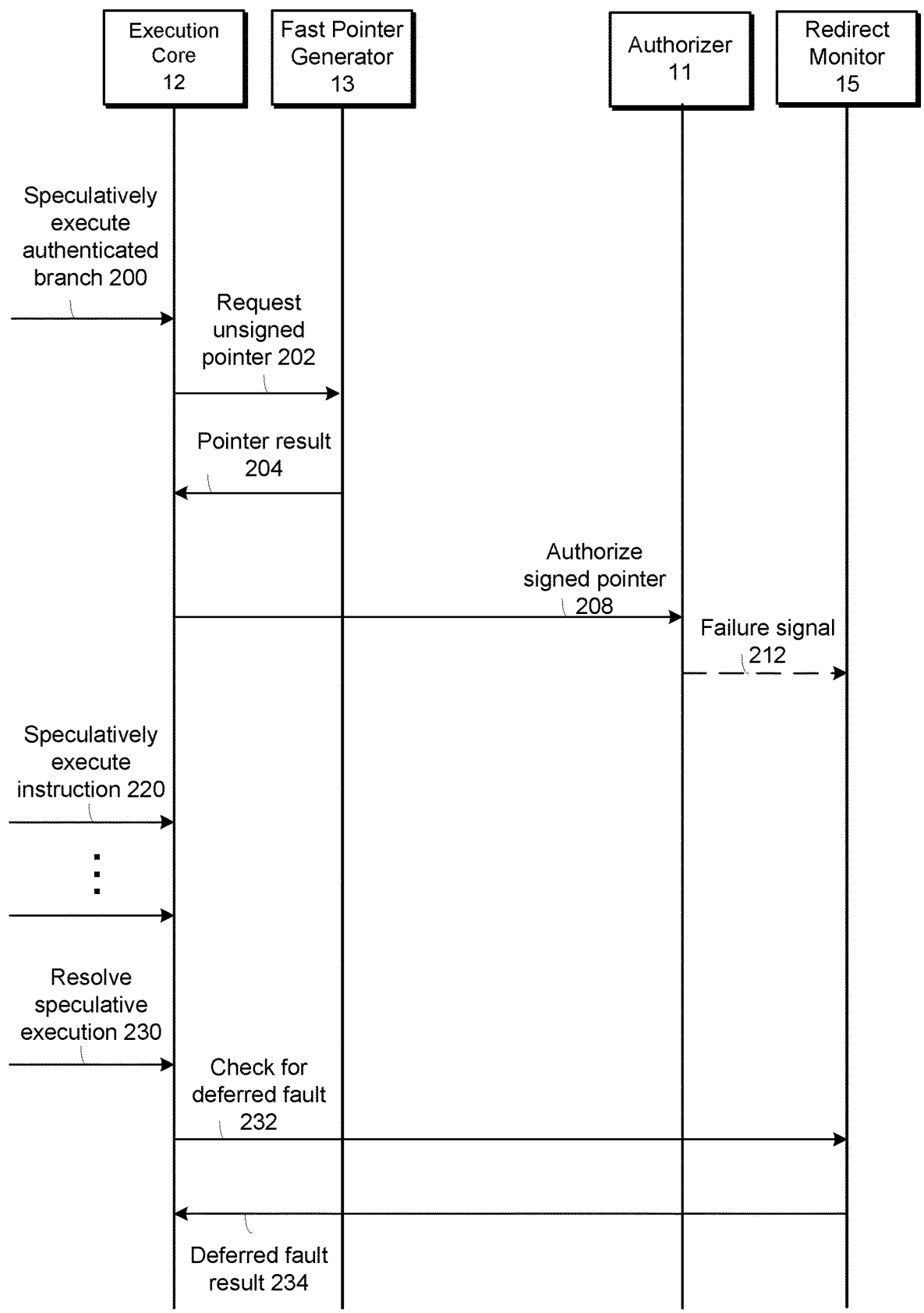
FIG. 13 is a timing diagram illustrating a sequence of events implementing an authenticated load branch, in one embodiment.

Turning now to FIG. 13, a timing diagram is shown illustrating a sequence of events implementing an authenticated load branch, in one embodiment. As shown in 200, an authenticated branch instruction may be decoded for speculative execution by an execution core 12 of a processor. First, the execution core 12 may request an unsigned memory address pointer 202 of a fast pointer generator 13, where the unsigned memory address pointer would match a pointer resulting from a successful authentication of a signed memory address pointer operand of the load/store instruction. This unsigned memory address pointer may then be provided to execution core 12 as part of a request to perform a speculative branch operation 204.

Independently of the load/store operation, the execution core 12 may request authorization of a signed pointer operand of the instruction 208 to an authorizer 11. Should authorization of the signed pointer fail, the authorizer 11 may report the failure 212 to a redirect monitor 15. Should authorization succeed, reporting of an authorized pointer by the authorizer 11 is not needed as authorization success was assumed in step 204. Speculative execution by the processor may then continue for additional instructions decoded for speculative execution as shown in 220.

Then, upon resolution of a speculative execution condition 230, the execution core 12 may resolve speculative execution of the various instructions by checking for a deferred fault 232 from the redirect monitor 15. If a deferred fault is registered, such as in step 212, the fault may be returned to the execution core 12 for subsequent reporting.

Figure 14:
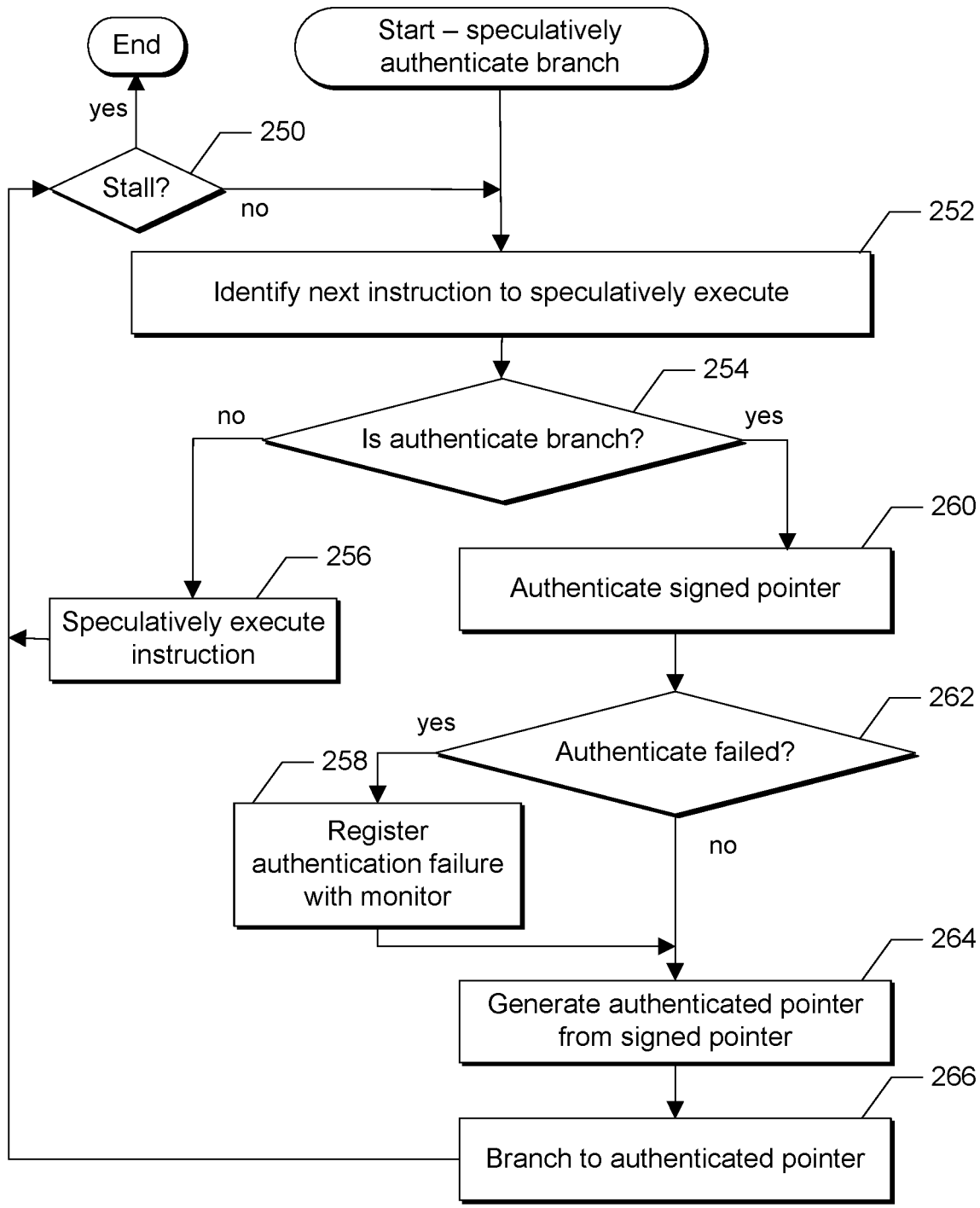
FIG. 14 is a flowchart illustrating an authenticated branch instruction, in one embodiment.

Turning now to FIG. 14, a flowchart is shown illustrating an authenticated branch instruction, in one embodiment. The process begins at step 252 where a next instruction to speculatively execute is identified. If the instruction is an authenticated branch instruction, as indicated by a positive exit from 254, the process may advance to 260. If the instruction is not an authenticated branch instruction, as indicated by a negative exit from 254, the process may advance to 256.

As shown in 256, the process may then speculatively execute the instruction. Speculatively execution of the instruction may result in generation of a deferred exception condition, with or without a stalling of speculative execution. If speculative execution stalls, as shown in a positive exit from 250, the process is complete. If speculative execution does not stall, as shown in a negative exit from 250, the process may return to 252.

As shown in 260, authentication of a signed pointer operand of the instruction may then be performed. If the authentication fails, as shown in a positive exit from 262, the authentication failure may be registered 258 with a monitor, such as the redirect monitor 15 of FIG. 1, for future reporting as discussed in FIG. 10 above and the process may advance to 264. If the authentication succeeds, as shown in a negative exit from 262, the process may advance to 264.

As shown in 264, an unsigned pointer, equivalent to a pointer returned through successful authentication of the signed pointer operand, may then be generated, such as by the fast pointer generator 13 of FIG. 1. Execution control may be transferred to this pointer address to perform the branch portion of the instruction. As speculative execution of the authentication branch does not stall, the process may then return to 252.

Figure 15:
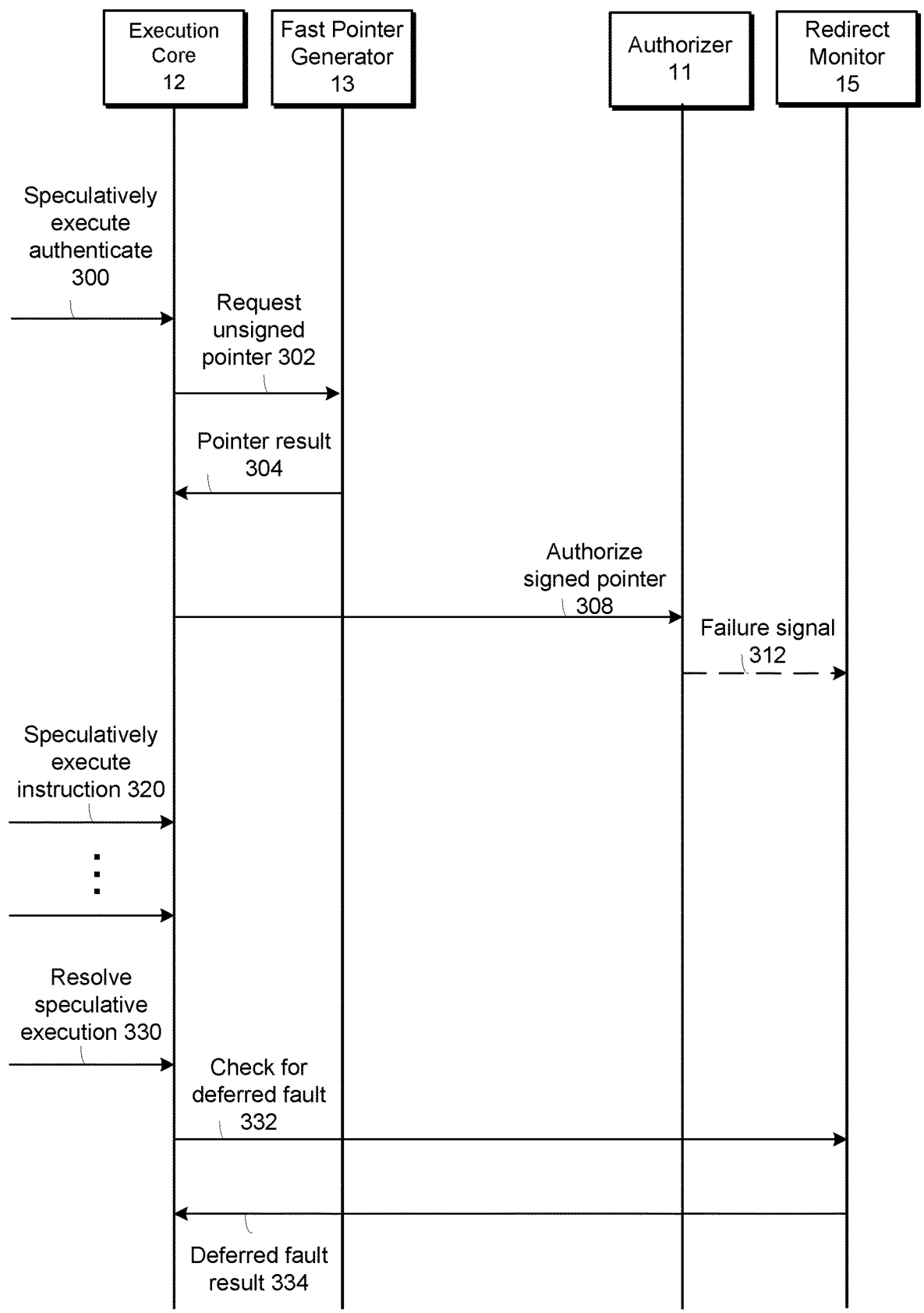
FIG. 15 is a timing diagram illustrating a sequence of events implementing an authentication instruction, in one embodiment.

Turning now to FIG. 15, a timing diagram is shown illustrating a sequence of events implementing an authentication instruction, in one embodiment. As shown in 300, an authentication instruction may be decoded for speculative execution by an execution core 12 of a processor. First, the execution core 12 may request an unsigned memory address pointer 302 of a fast pointer generator 13, where the unsigned memory address pointer would match a pointer resulting from a successful authentication of a signed memory address pointer operand of the load/store instruction. This unsigned memory address pointer may then be provided to execution core 12 as part of a request to perform a speculative branch operation 304.

Independently of the load/store operation, the execution core 12 may request authorization of a signed pointer operand of the instruction 308 to an authorizer 11. Should authorization of the signed pointer fail, the authorizer 11 may report the failure 312 to a redirect monitor 15. Should authorization succeed, reporting of an authorized pointer by the authorizer 11 is not needed as authorization success was assumed in step 304. Speculative execution by the processor may then continue for additional instructions decoded for speculative execution as shown in 320.

Then, upon resolution of a speculative execution condition 330, the execution core 12 may resolve speculative execution of the various instructions by checking for a deferred fault 332 from the redirect monitor 15. If a deferred fault is registered, such as in step 312, the fault may be returned to the execution core 12 for subsequent reporting.

Figure 16:
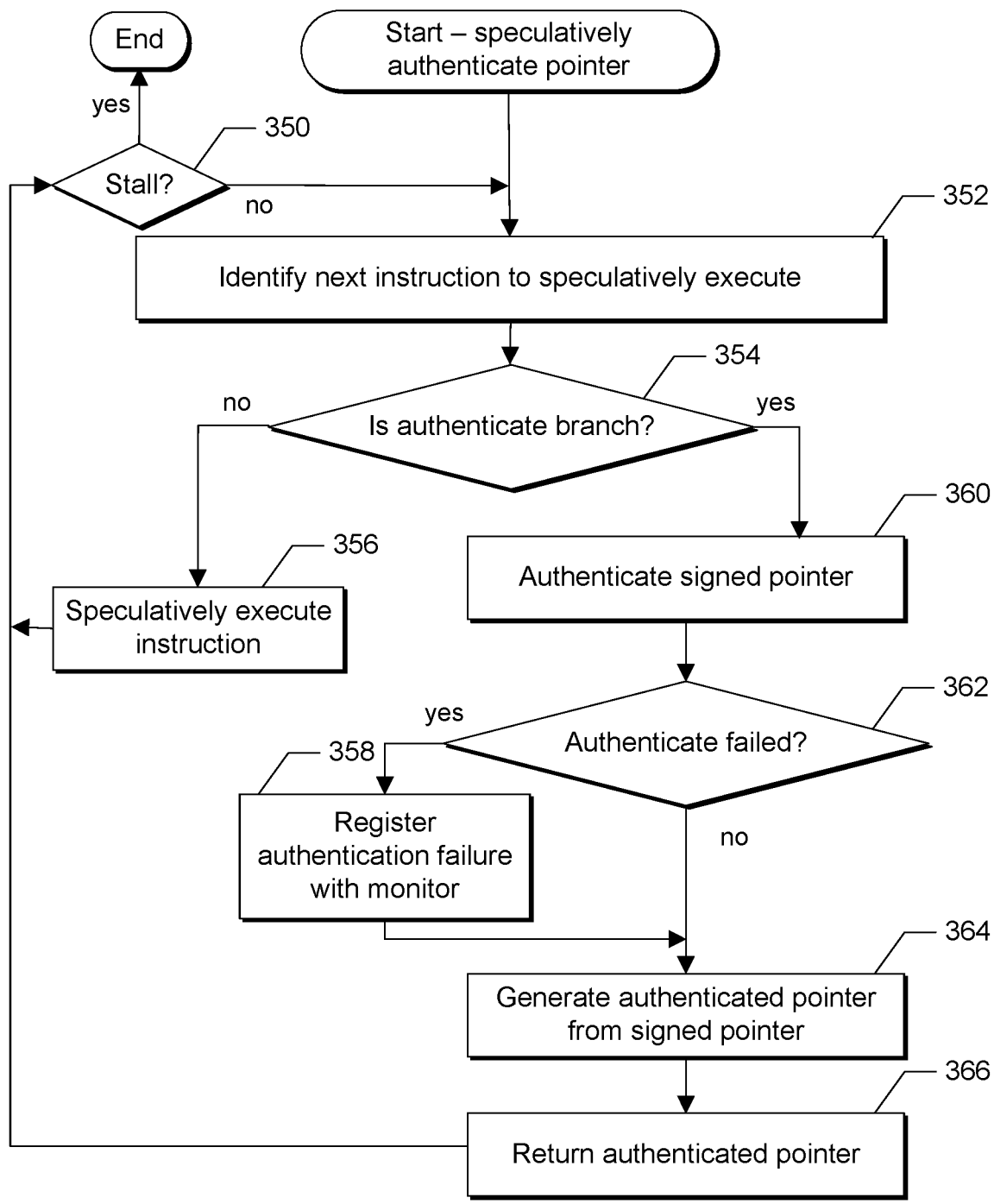
FIG. 16 is a flowchart illustrating an authentication instruction, in one embodiment.

Turning now to FIG. 16, a flowchart is shown illustrating an authentication instruction, in one embodiment. The process begins at step 352 where a next instruction to speculatively execute is identified. If the instruction is an authentication instruction, as indicated by a positive exit from 354, the process may advance to 360. If the instruction is not an authentication instruction, as indicated by a negative exit from 354, the process may advance to 356.

As shown in 356, the process may then speculatively execute the instruction. Speculatively execution of the instruction may result in generation of a deferred exception condition, with or without a stalling of speculative execution. If speculative execution stalls, as shown in a positive exit from 350, the process is complete. If speculative execution does not stall, as shown in a negative exit from 350, the process may return to 352.

As shown in 360, authentication of a signed pointer operand of the instruction may then be performed. If the authentication fails, as shown in a positive exit from 362, the authentication failure may be registered 358 with a monitor, such as the redirect monitor 15 of FIG. 1, for future reporting as discussed in FIG. 10 above and the process may advance to 364. If the authentication succeeds, as shown in a negative exit from 362, the process may advance to 364.

As shown in 364, an unsigned pointer, equivalent to a pointer returned through successful authentication of the signed pointer operand, may then be generated, such as by the fast pointer generator 13 of FIG. 1. This pointer may then be returned to complete speculative execution of the instruction. As speculative execution of the authentication branch does not stall, the process may then return to 352.

Figure 17:
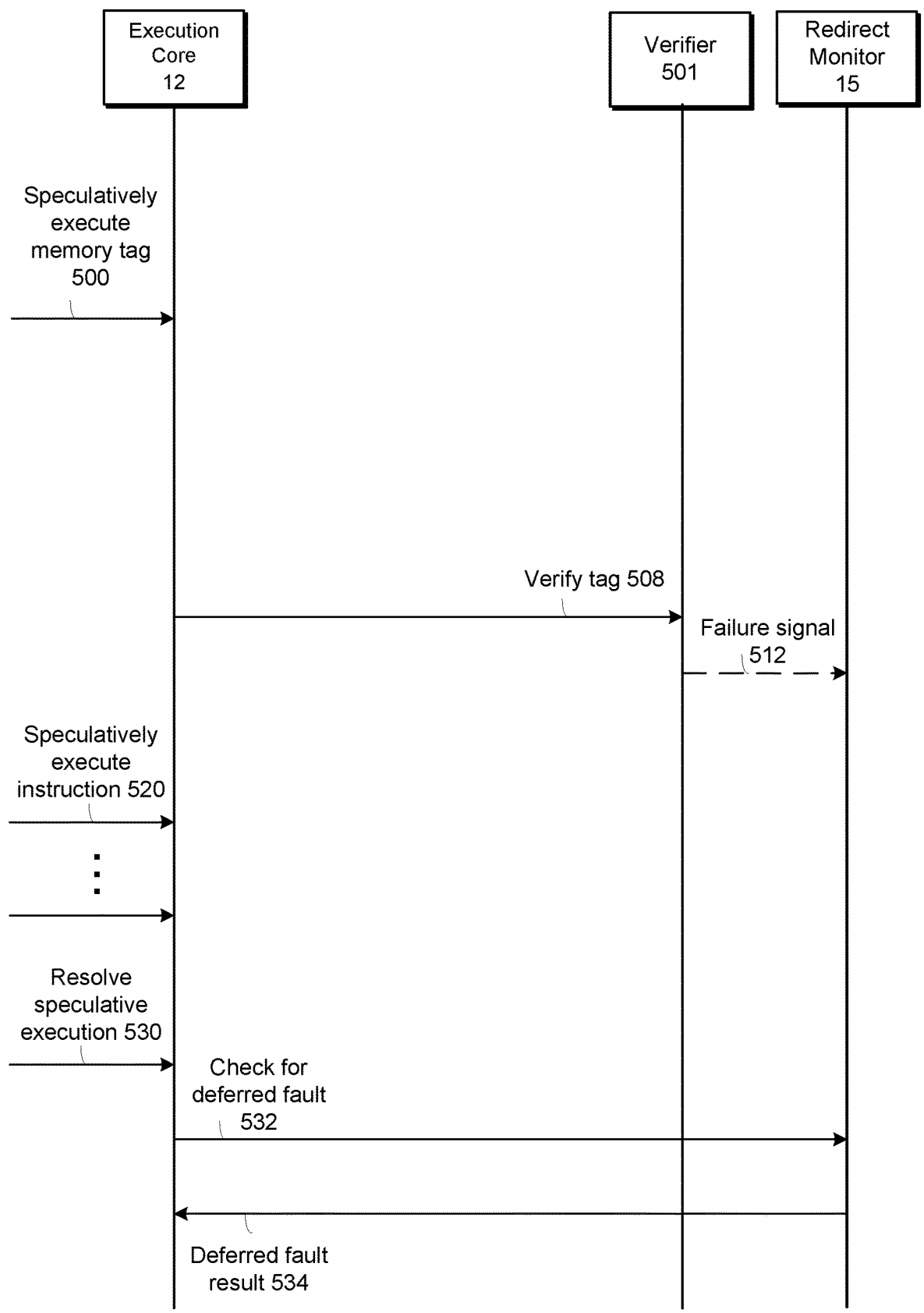
FIG. 17 is a timing diagram illustrating a sequence of events implementing an authenticated memory tag instruction, in one embodiment.

Turning now to FIG. 17, a timing diagram is shown illustrating a sequence of events implementing an authenticated memory tag instruction, in one embodiment. As shown in 500, an authenticated memory tag instruction may be decoded for speculative execution by an execution core 12 of a processor. The execution core 12 may request verification of a memory tag operand of the instruction 508 to an authorizer 11. Should verification fail, the authorizer 11 may report the failure 512 to a redirect monitor 15. Speculative execution by the processor may then continue for additional instructions decoded for speculative execution as shown in 520.

Then, upon resolution of a speculative execution condition 530, the execution core 12 may resolve speculative execution of the various instructions by checking for a deferred fault 532 from the redirect monitor 15. If a deferred fault is registered, such as in step 512, the fault may be returned to the execution core 12 for subsequent reporting.

Figure 18:
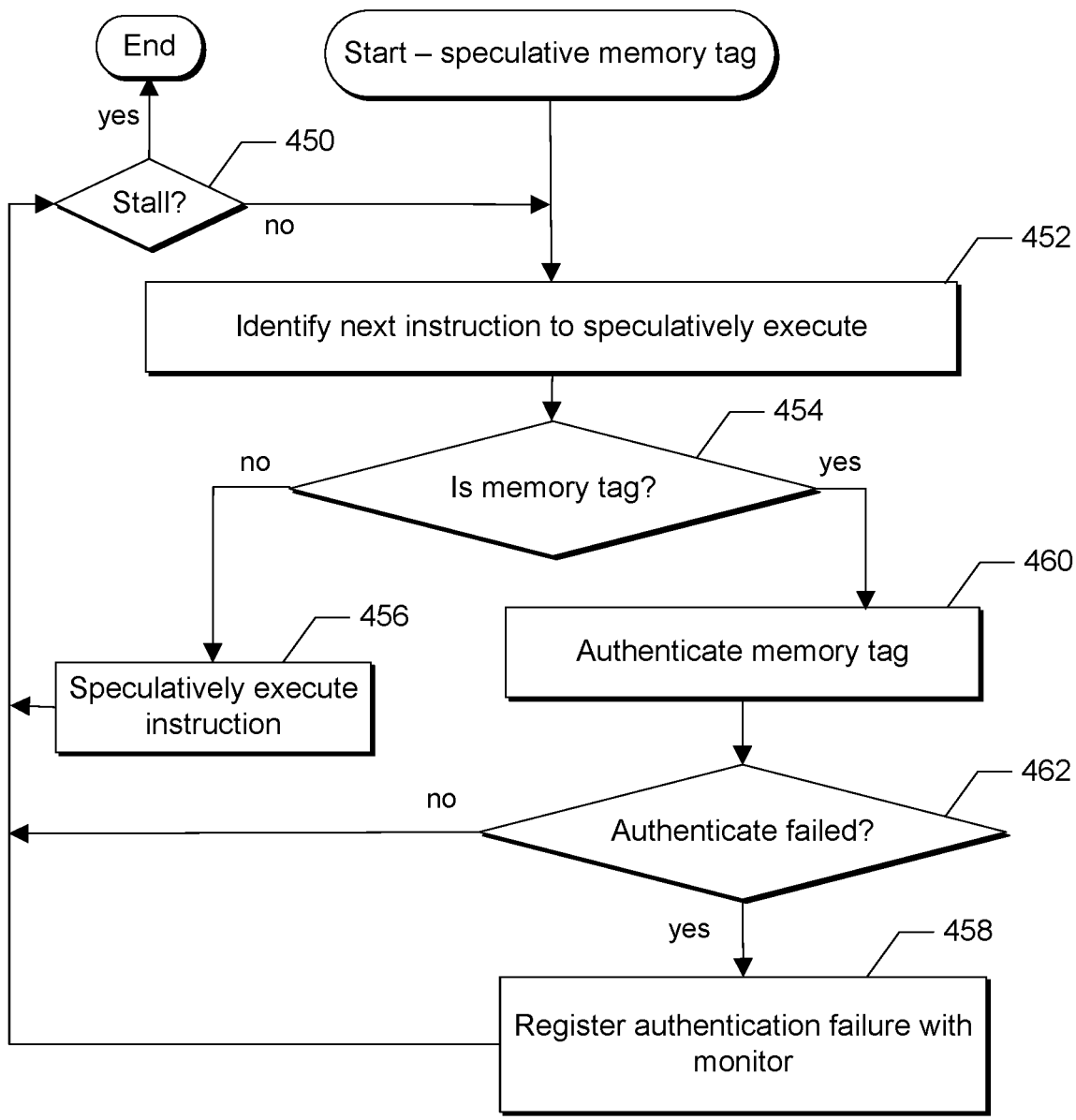
FIG. 18 is a flowchart illustrating an authenticated memory tag instruction, in one embodiment.

Turning now to FIG. 18, a flowchart is shown illustrating an authenticated memory tag instruction, in one embodiment. The process begins at step 452 where a next instruction to speculatively execute is identified. If the instruction is an authenticated memory tag instruction, as indicated by a positive exit from 454, the process may advance to 460. If the instruction is not an authentication instruction, as indicated by a negative exit from 454, the process may advance to 456.

As shown in 456, the process may then speculatively execute the instruction. Speculatively execution of the instruction may result in generation of a deferred exception condition, with or without a stalling of speculative execution. If speculative execution stalls, as shown in a positive exit from 450, the process is complete. If speculative execution does not stall, as shown in a negative exit from 450, the process may return to 452.

As shown in 460, authentication of the memory tag operand of the instruction may then be performed. If the authentication fails, as shown in a positive exit from 462, the authentication failure may be registered 458 with a monitor, such as the redirect monitor 15 of FIG. 1, for future reporting as discussed in FIG. 10 above and the process may advance to 464. If the authentication succeeds, as shown in a negative exit from 462, the process may then return to 452.

Figure 19:
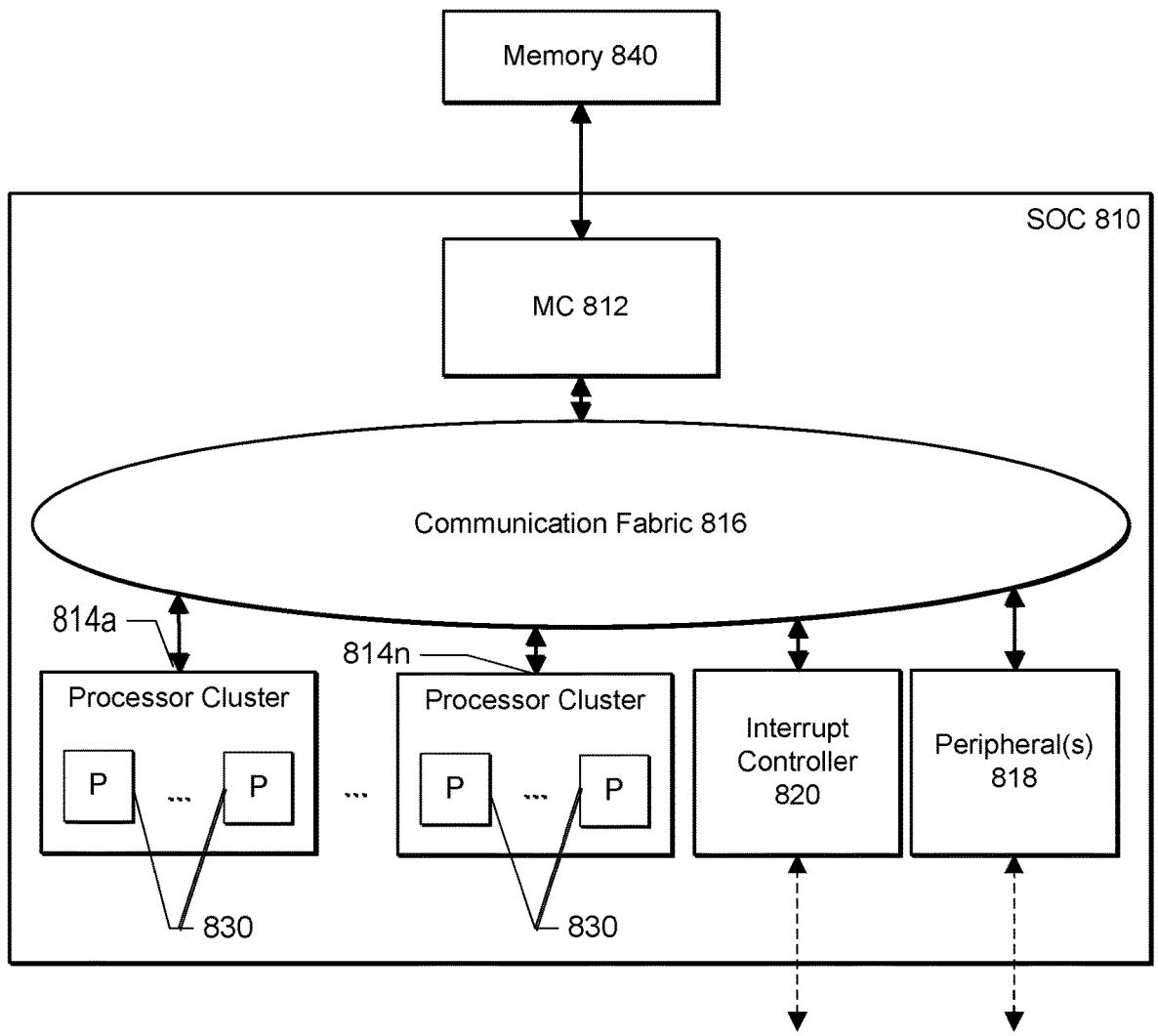

Turning now to FIG. 19, a block diagram one embodiment of a system that may include one or more processors described in FIGS. 1-18. In the illustrated embodiment, the system may be implemented as a system on a chip (SOC) 810 coupled to a memory 840. As implied by the name, the components of the SOC 810 may be integrated onto a single semiconductor substrate as an integrated circuit "chip." In some embodiments, the components may be implemented on two or more discrete chips in a system. However, the SOC 810 will be used as an example herein. In the illustrated embodiment, the components of the SOC 810 include a plurality of processor clusters 814a-814n, the interrupt controller 820, one or more peripheral components 818 (more briefly, "peripherals"), a memory controller 840, and a communication fabric 816. The components 814a-814n, 818, 820, and 840 may all be coupled to the communication fabric 816. The memory controller 840 may be coupled to the memory 840 during use. In some embodiments, there may be more than one memory controller coupled to corresponding memory. The memory address space may be mapped across the memory controllers in any desired fashion. In the illustrated embodiment, the processor clusters 814a-814n may include the respective plurality of processors (P) 830. The processors 830 may form the central processing units (CPU(s)) of the SOC 810. In an embodiment, one or more processor clusters 814a-814n may not be used as CPUs.

As mentioned above, the processor clusters 814a-814n may include one or more processors 830 that may serve as the CPU of the SOC 810. The CPU of the system includes the processor(s) that execute the main control software of the system, such as an operating system. Generally, software executed by the CPU during use may control the other components of the system to realize the desired functionality of the system. The processors may also execute other software, such as application programs. The application programs may provide user functionality, and may rely on the operating system for lower-level device control, scheduling, memory management, etc. Accordingly, the processors may also be referred to as application processors.

Generally, a processor may include any circuitry and/or microcode configured to execute instructions defined in an instruction set architecture implemented by the processor. Processors may encompass processor cores implemented on an integrated circuit with other components as a system on a chip (SOC 810) or other levels of integration. Processors may further encompass discrete microprocessors, processor cores and/or microprocessors integrated into multichip module implementations, processors implemented as multiple integrated circuits, etc.

The memory controller 840 may generally include the circuitry for receiving memory operations from the other components of the SOC 810 and for accessing the memory 840 to complete the memory operations. The memory controller 840 may be configured to access any type of memory 840. For example, the memory 840 may be static random-access memory (SRAM), dynamic RAM (DRAM) such as synchronous DRAM (SDRAM) including double data rate (DDR, DDR2, DDR3, DDR4, etc.) DRAM. Low power/ mobile versions of the DDR DRAM may be supported (e.g., LPDDR, mDDR, etc.). The memory controller 840 may include queues for memory operations, for ordering (and potentially reordering) the operations and presenting the operations to the memory 840. The memory controller 840 may further include data buffers to store write data awaiting write to memory and read data awaiting return to the source of the memory operation. In some embodiments, the memory controller 840 may include a memory cache to store recently accessed memory data. In SOC implementations, for example, the memory cache may reduce power consumption in the SOC by avoiding re-access of data from the memory 840 if it is expected to be accessed again soon. In some cases, the memory cache may also be referred to as a system cache, as opposed to private caches such as the L2 cache or caches in the processors, which serve only certain components. Additionally, in some embodiments, a system cache need not be located within the memory controller 840.

The peripherals 818 may be any set of additional hardware functionality included in the SOC 810. For example, the peripherals 818 may include video peripherals such as an image signal processor configured to process image capture data from a camera or other image sensor, GPUs, video encoder/decoders, scalers, rotators, blenders, display controller, etc. The peripherals may include audio peripherals such as microphones, speakers, interfaces to microphones and speakers, audio processors, digital signal processors, mixers, etc. The peripherals may include interface controllers for various interfaces external to the SOC 810 including interfaces such as Universal Serial Bus (USB), peripheral component interconnect (PCI) including PCI Express (PCIe), serial and parallel ports, etc. The peripherals may include networking peripherals such as media access controllers (MACs). Any set of hardware may be included.

The communication fabric 816 may be any communication interconnect and protocol for communicating among the components of the SOC 810. The communication fabric 816 may be bus-based, including shared bus configurations, cross bar configurations, and hierarchical buses with bridges. The communication fabric 816 may also be packet-based, and may be hierarchical with bridges, cross bar, point-to-point, or other interconnects.

It is noted that the number of components of the SOC 810 (and the number of subcomponents for those shown in FIG. 19, such as the processors 830 in each processor cluster 814a-814n may vary from embodiment to embodiment. Additionally, the number of processors 830 in one processor cluster 814a-814n may differ from the number of processors 830 in another processor cluster 814a-814n. There may be more or fewer of each component/subcomponent than the number shown in FIG. 19.

Computer System

Figure 20:
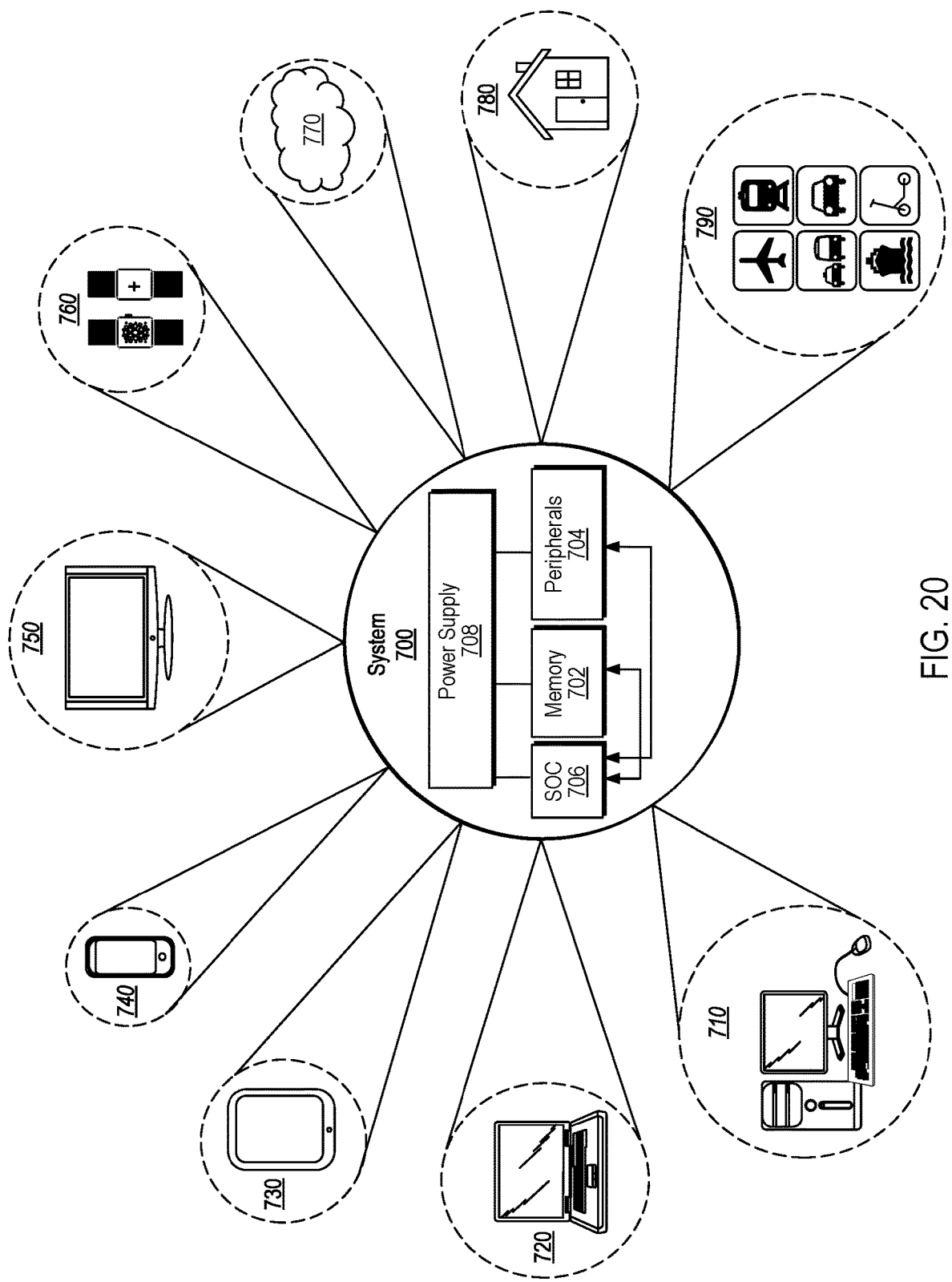
FIG. 20 is a block diagram of one embodiment of a system.

Turning next to FIG. 20, a block diagram of one embodiment of a system 700 is shown. In the illustrated embodiment, the system 700 includes at least one instance of a system on a chip (SOC) 706 coupled to one or more peripherals 704 and an external memory 702. A power supply (PMU) 708 is provided which supplies the supply voltages to the SOC 706 as well as one or more supply voltages to the memory 702 and/or the peripherals 704. In some embodiments, more than one instance of the SOC may be included (and more than one memory 702 may be included as well). The SOC 706 may include one or more instances of the processor 10 illustrated in FIG. 1, in an embodiment.

The peripherals 704 may include any desired circuitry, depending on the type of system 700. For example, in one embodiment, the system 704 may be a mobile device (e.g., personal digital assistant (PDA), smart phone, etc.) and the peripherals 704 may include devices for various types of wireless communication, such as Wi-Fi, Bluetooth, cellular, global positioning system, etc. The peripherals 704 may also include additional storage, including RAM storage, solid state storage, or disk storage. The peripherals 704 may include user interface devices such as a display screen, including touch display screens or multitouch display screens, keyboard or other input devices, microphones, speakers, etc. In other embodiments, the system 700 may be any type of computing system (e.g., desktop personal computer, laptop, workstation, net top etc.).

The external memory 702 may include any type of memory. For example, the external memory 702 may be SRAM, dynamic RAM (DRAM) such as synchronous DRAM (SDRAM), double data rate (DDR, DDR2, DDR3, etc.) SDRAM, RAMBUS DRAM, low power versions of the DDR DRAM (e.g., LPDDR, mDDR, etc.), etc. The external memory 702 may include one or more memory modules to which the memory devices are mounted, such as single inline memory modules (SIMMs), dual inline memory modules (DIMMs), etc. Alternatively, the external memory 702 may include one or more memory devices that are mounted on the SOC 706 in a chip-on-chip or package-on-package implementation.

As illustrated, system 700 is shown to have application in a wide range of areas. For example, system 700 may be utilized as part of the chips, circuitry, components, etc., of a desktop computer 710, laptop computer 720, tablet computer 730, cellular or mobile phone 740, or television 750 (or set-top box coupled to a television). Also illustrated is a smartwatch and health monitoring device 760. In some embodiments, smartwatch may include a variety of general-purpose computing related functions. For example, smartwatch may provide access to email, cellphone service, a user calendar, and so on. In various embodiments, a health monitoring device may be a dedicated medical device or otherwise include dedicated health related functionality. For example, a health monitoring device may monitor a user's vital signs, track proximity of a user to other users for the purpose of epidemiological social distancing, contact tracing, provide communication to an emergency service in the event of a health crisis, and so on. In various embodiments, the above-mentioned smartwatch may or may not include some or any health monitoring related functions. Other wearable devices are contemplated as well, such as devices worn around the neck, devices that are implantable in the human body, glasses designed to provide an augmented and/or virtual reality experience, and so on.

System 700 may further be used as part of a cloud-based service(s) 770. For example, the previously mentioned devices, and/or other devices, may access computing resources in the cloud (i.e., remotely located hardware and/or software resources). Still further, system 700 may be utilized in one or more devices of a home 780 other than those previously mentioned. For example, appliances within the home may monitor and detect conditions that warrant attention. For example, various devices within the home (e.g., a refrigerator, a cooling system, etc.) may monitor the status of the device and provide an alert to the homeowner (or, for example, a repair facility) should a particular event be detected. Alternatively, a thermostat may monitor the temperature in the home and may automate adjustments to a heating/cooling system based on a history of responses to various conditions by the homeowner. Also illustrated in FIG. 8 is the application of system 700 to various modes of transportation 790. For example, system 700 may be used in the control and/or entertainment systems of aircraft, trains, buses, cars for hire, private automobiles, waterborne vessels from private boats to cruise liners, scooters (for rent or owned), and so on. In various cases, system 700 may be used to provide automated guidance (e.g., self-driving vehicles), general systems control, and otherwise. These any many other embodiments are possible and are contemplated. It is noted that the devices and applications illustrated in FIG. 8 are illustrative only and are not intended to be limiting. Other devices are possible and are contemplated.

Computer Readable Storage Medium

Figure 21:
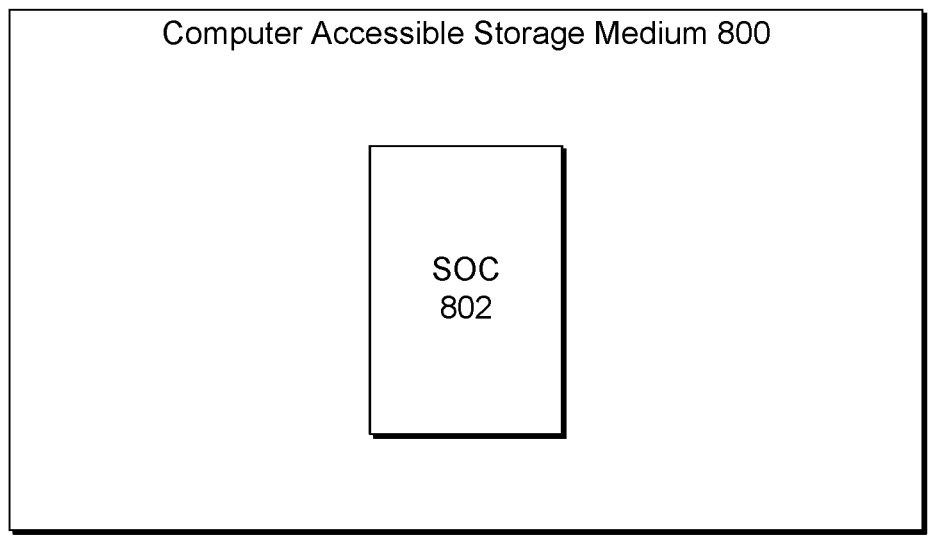
FIG. 21 is a block diagram of one embodiment of a computer accessible storage medium.

Turning now to FIG. 21, a block diagram of one embodiment of a computer readable storage medium 800 is shown. Generally speaking, a computer accessible storage medium may include any storage media accessible by a computer during use to provide instructions and/or data to the computer. For example, a computer accessible storage medium may include storage media such as magnetic or optical media, e.g., disk (fixed or removable), tape, CD-ROM, DVD-ROM, CD-R, CD-RW, DVD-R. DVD-RW, or Blu-Ray. Storage media may further include volatile or non-volatile memory media such as RAM (e.g., synchronous dynamic RAM (SDRAM), Rambus DRAM (RDRAM), static RAM (SRAM), etc.), ROM, or Flash memory. The storage media may be physically included within the computer to which the storage media provides instructions/data. Alternatively, the storage media may be connected to the computer. For example, the storage media may be connected to the computer over a network or wireless link, such as network attached storage. The storage media may be connected through a peripheral interface such as the Universal Serial Bus (USB). Generally, the computer accessible storage medium 800 may store data in a non-transitory manner, where non-transitory in this context may refer to not transmitting the instructions/data on a signal. For example, non-transitory storage may be volatile (and may lose the stored instructions/data in response to a power down) or non-volatile.

The computer accessible storage medium 800 in FIG. 9 may store a database 804 representative of the SOC 706. Generally, the database 804 may be a database which can be read by a program and used, directly or indirectly, to fabricate the hardware comprising the SOC 706. For example, the database may be a behavioral-level description or register-transfer level (RTL) description of the hardware functionality in a high-level design language (HDL) such as Verilog or VHDL. The description may be read by a synthesis tool which may synthesize the description to produce a netlist comprising a list of gates from a synthesis library. The netlist comprises a set of gates which also represent the functionality of the hardware comprising the SOC 706. The netlist may then be placed and routed to produce a data set describing geometric shapes to be applied to masks. The masks may then be used in various semiconductor fabrication steps to produce a semiconductor circuit or circuits corresponding to the SOC 706. Alternatively, the database 804 on the computer accessible storage medium 800 may be the netlist (with or without the synthesis library) or the data set, as desired.

While the computer accessible storage medium 800 stores a representation of the SOC 706, other embodiments may carry a representation of any portion of the SOC 706, as desired, including the processor 10 as shown in FIG. 1 or any subset thereof.

The present disclosure includes references to an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more of the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims.

Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements defined by the functions or operations that they are configured to implement. The arrangement of such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g., passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

Numerous variations and modifications will become apparent to those skilled in the art once the above disclosure is fully appreciated. It is intended that the following claims be interpreted to embrace all such variations and modifications.

What is claimed is:

1. A processor, comprising:
an authentication circuit configured to authenticate instruction operands; and
an execution circuit configured to speculatively execute, responsive to an unresolved condition, an instruction stream comprising a plurality of instructions including an instruction comprising authentication of an instruction operand, wherein to speculatively execute the instruction stream the execution circuit is configured to:
  perform, using the authorization circuit, the authentication of the instruction operand, as part of speculatively executing the instruction, to generate an authentication result;
  continue speculative execution of the instruction stream to generate an observable state of the processor independent of the generated authentication result, wherein to continue speculative execution the execution circuit is configured to:
    complete speculative execution of the instruction; and
    speculatively execute at least one additional instruction of the plurality of instructions subsequent to completing speculative execution of the instruction; and
  defer reporting the generated authentication result until resolution of the condition.

2. The processor as recited in claim 1, wherein the execution circuit is further configured to execute, responsive to resolution of the unresolved condition, the instruction stream, wherein to execute the instruction stream the execution circuit is further configured to:
responsive to the authentication result indicating an authentication failure:
suspend processor execution at the instruction; and
generate a processor fault.

3. The processor as recited in claim 1, wherein the observable state of the processor comprises a cumulative state of processor circuitry detectable by an instrumented side channel of the processor, and wherein the observable state of the processor is independent of the generated authentication result based on an absence of detectable differences in respective cumulative states of processor circuitry being observable by the instrumented side channel of the processor for different generated authentication result values including a passing authentication result value and a failing authentication result value.

4. The processor as recited in claim 1, wherein the authentication result indicates an authentication failure, wherein the deferred reporting of the authentication result is a speculative fault source of a plurality of speculative fault sources of the speculative execution of the plurality of instructions, and wherein, subsequent to resolution of the condition, a processor fault is generated according to an oldest fault source of the plurality of speculative fault sources.

5. The processor as recited in claim 1, wherein to speculatively execute the one or more of the plurality of instructions the execution circuit is configured to stall the speculative execution responsive to receiving a fault signal.

6. The processor as recited in claim 1, wherein the instruction operand is a signed memory pointer comprising a memory address and a signature stored in a single memory word of the processor.

7. The processor as recited in claim 6, wherein the instruction is an authorized load instruction, and wherein to speculatively execute the instruction the processor is configured to:
generate an unsigned memory pointer comprising the memory address of the signed memory pointer; and
load a value without authentication of the instruction operand according to the unsigned memory pointer.

8. The processor as recited in claim 6, wherein the instruction is an authorized branch instruction, and wherein to execute the instruction the processor is configured to:
generate an unsigned memory pointer comprising the memory address of the signed memory pointer; and
transfer control of execution to the memory address of the unsigned memory pointer.

9. The processor as recited in claim 1, wherein the instruction operand comprises a memory address and a memory tag, and wherein the authentication result comprises a comparison of the memory tag with an associated memory tag of a memory region comprising the memory address.

10. A method, comprising:
speculatively executing, by an execution circuit of a processor responsive to an unresolved condition, an instruction stream comprising a plurality of instructions including an instruction comprising authentication of an instruction operand, the speculatively executing comprising:
performing the authentication of the instruction operand as part of speculatively executing the instruction to generate an authentication result;
continuing speculative execution of the instruction stream to generate an observable state of the processor independent of the generated authentication result, wherein continuing speculative execution comprises:
completing speculative execution of the instruction; and
speculatively executing at least one additional instruction of the plurality of instructions subsequent to completing speculative execution of the instruction; and
deferring reporting the generated authentication result until resolution of the condition.

11. The method as recited in claim 10, further comprising executing the instruction stream responsive to resolution of the condition indicating that the instruction stream is to be executed, the executing comprising:
responsive to the authentication result indicating an authentication failure:
suspending processor execution at the instruction; and
generating a processor fault.

12. The method as recited in claim 10, wherein the observable state of the processor comprises a cumulative state of processor circuitry detectable by an instrumented side channel of the processor, and wherein the observable state of the processor is independent of the generated authentication result based an absence of no detectable differences in respective cumulative states of processor circuitry being observable by the instrumented side channel of the processor for different generated authentication result values including a passing authentication result value and a failing authentication result value.

13. The method as recited in claim 12, wherein the authentication result indicates an authentication failure, wherein the deferred reporting of the authentication failure is a speculative fault source of a plurality of speculative fault sources of the speculative execution of the plurality of instructions, and wherein a processor fault is generated according to an oldest fault source of the plurality of speculative fault sources.

14. The method as recited in claim 12, wherein speculatively executing the one or more of the plurality of instructions comprises stalling speculative execution responsive to receiving a fault signal.

15. The method as recited in claim 12, wherein the instrumented side channel of the processor comprises another instruction stream executing on the processor to measure latency of execution of the instruction stream.

16. The method as recited in claim 10, wherein the instruction operand is a signed memory pointer comprising a memory address and a signature stored in a single memory word of the processor.

17. The method as recited in claim 16, wherein the instruction is an authorized load instruction, and wherein speculatively executing the instruction comprises:
generating an unsigned memory pointer comprising the memory address of the signed memory pointer; and
loading a value without authentication of the instruction operand according to the unsigned memory pointer.

18. The method as recited in claim 16, wherein the instruction is an authorized branch instruction, and wherein speculatively executing the instruction comprises:
generating an unsigned memory pointer comprising the memory address of the signed memory pointer; and
transferring control of execution to the memory address of the unsigned memory pointer.

19. A system, comprising:
a memory configured to store a plurality of instructions; and a processor comprising:
  an authentication circuit configured to authenticate instruction operands; and
  an execution circuit configured to:
    speculatively execute, responsive to an unresolved condition, an instruction stream comprising a plurality of instructions including an instruction comprising authentication of an instruction operand, wherein to speculatively execute the instruction stream the execution circuit is configured to:
      perform, using the authorization circuit, the authentication of the instruction operand as part of speculatively executing the instruction to generate an authentication result;
      continue speculative execution of the instruction stream to generate an observable state of the processor independent of the generated authentication result, wherein to continue speculative execution the execution circuit is configured to:
        complete speculative execution of the instruction; and
        speculatively execute one or more of the plurality of instructions subsequent to completing speculative execution of the instruction; and
    execute, responsive to resolution of the condition indicating that the instruction stream is to be executed, the instruction stream, wherein to execute the instruction stream the execution circuit is configured to:
      responsive to the authentication result indicating an authentication failure:
        suspend processor execution at the instruction; and
        generate a processor fault.

20. The system as recited in claim 19, wherein the instruction operand is a signed memory pointer comprising a memory address and a signature stored in a single memory word of the processor, wherein the instruction is an authorized load instruction, and wherein to speculatively execute the instruction the processor is configured to:
  generate an unsigned memory pointer comprising the memory address of the signed memory pointer; and
  load a value without authentication of the instruction operand according to the unsigned memory pointer.

* * * * *